United States Patent

Sasaki et al.

[11] Patent Number: 6,125,029
[45] Date of Patent: Sep. 26, 2000

[54] ELECTRONIC APPARATUS WITH A CABLE EXTENDING BETWEEN MAIN BODY UNIT AND DISPLAY UNIT SUPPORTED ON THE MAIN BODY UNIT

[75] Inventors: Katsumaru Sasaki; Teruo Kinoshita, both of Tokyo, Japan

[73] Assignee: Kabushiki Kaisha Toshiba, Kawasaki, Japan

[21] Appl. No.: 09/046,650

[22] Filed: Mar. 24, 1998

[30] Foreign Application Priority Data

Mar. 27, 1997 [JP] Japan ................................. 9-075558

[51] Int. Cl.⁷ ........................................ G06F 1/16
[52] U.S. Cl. ........................................ 361/681; 345/905
[58] Field of Search ........................ 361/683, 681; 364/708.1; 345/169, 905

[56] References Cited

U.S. PATENT DOCUMENTS

| | | | |
|---|---|---|---|
| 4,937,708 | 6/1990 | Bristoll | 361/683 |
| 4,959,887 | 10/1990 | Gruenberg et al. | 364/708.1 |
| 5,114,036 | 5/1992 | Liu | 361/683 |
| 5,433,620 | 7/1995 | Kobayashi . | |
| 5,552,958 | 9/1996 | Seto et al. | 361/683 |
| 5,689,400 | 11/1997 | Ohgami et al. | 361/683 |

FOREIGN PATENT DOCUMENTS

| | | |
|---|---|---|
| 5-265592 | 10/1993 | Japan . |
| 6-75664 | 3/1994 | Japan . |
| 6-75665 | 3/1994 | Japan . |

*Primary Examiner*—Leo P. Picard
*Assistant Examiner*—John D. Reed
*Attorney, Agent, or Firm*—Finnegan, Henderson, Farabow, Garrett & Dunner, L.L.P.

[57] ABSTRACT

An electronic apparatus such as a portable computer includes a box-shaped housing body and a display unit supported on the housing body. A circuit board on which a cable connector is mounted is contained within the housing body. The display unit has a display housing containing a display device. A cable extending between the inside of the housing body and the inside of the display housing has a first end portion and a second end portion. The first end portion is electrically connected to the cable connector. The second end portion is electrically connected to the display device. The housing body has an opening portion for exposing the cable connector. The opening portion is covered by a detachable cover.

17 Claims, 15 Drawing Sheets

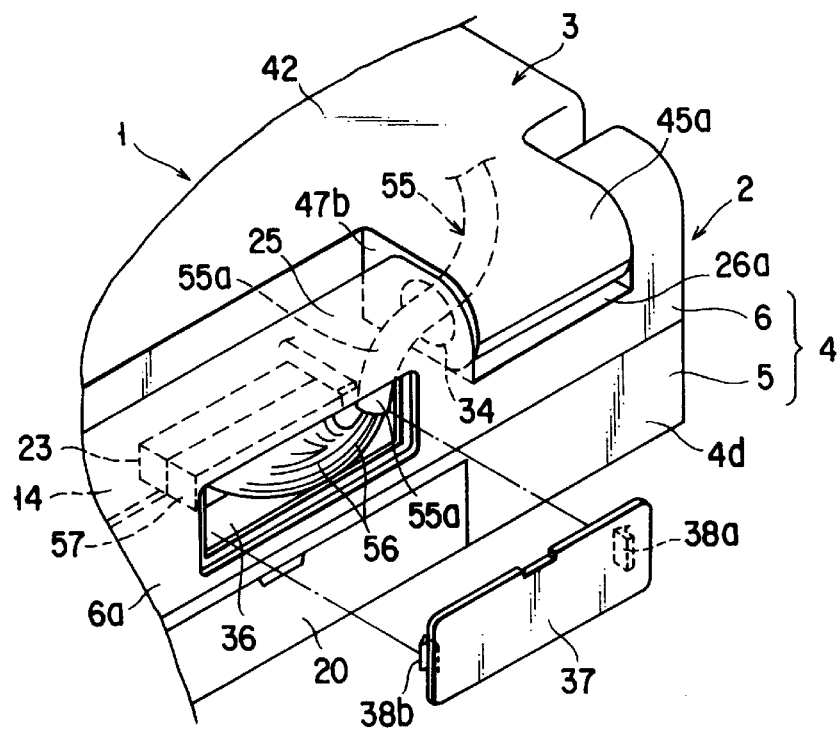
F I G. 2
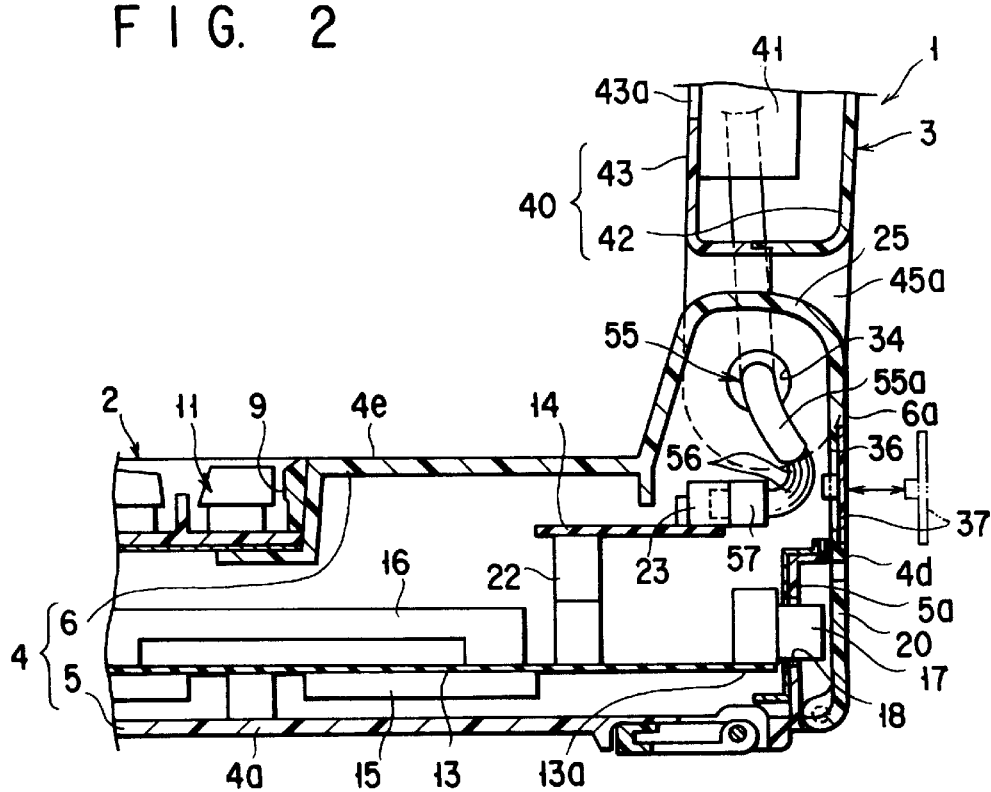
F I G. 3

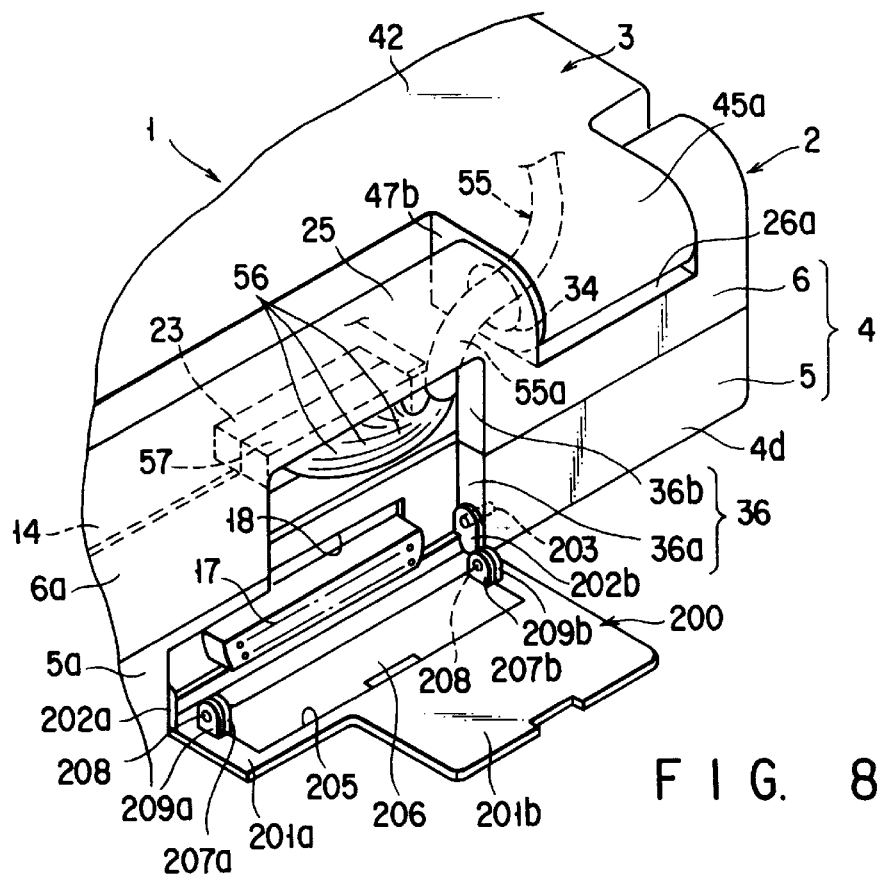
F I G. 8
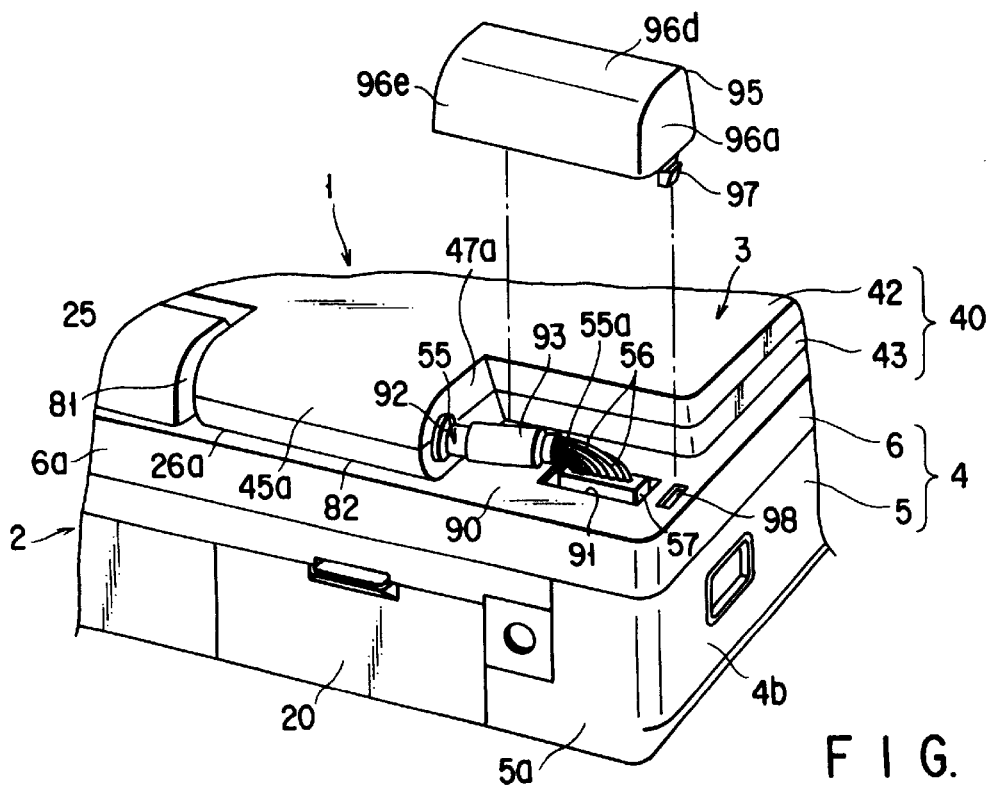
F I G. 9

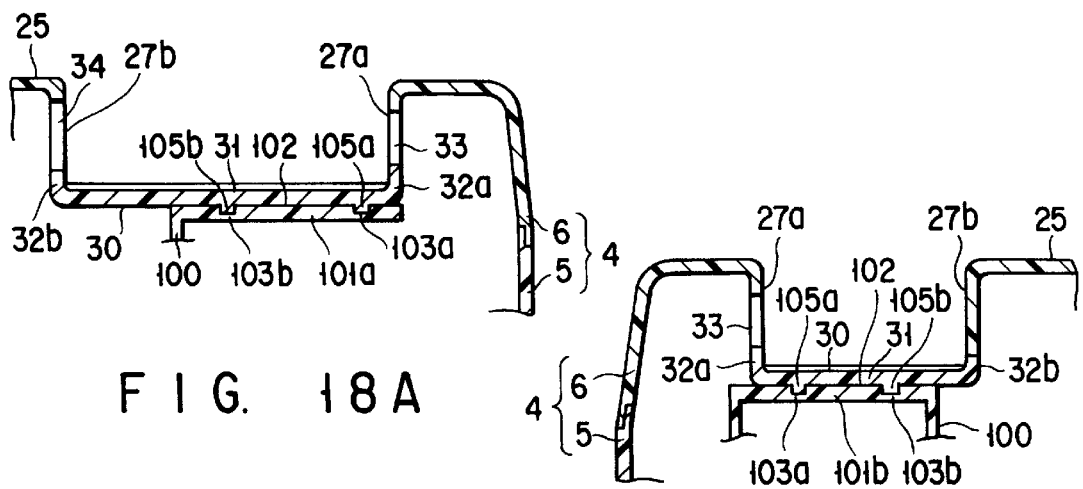
FIG. 18A
FIG. 18B
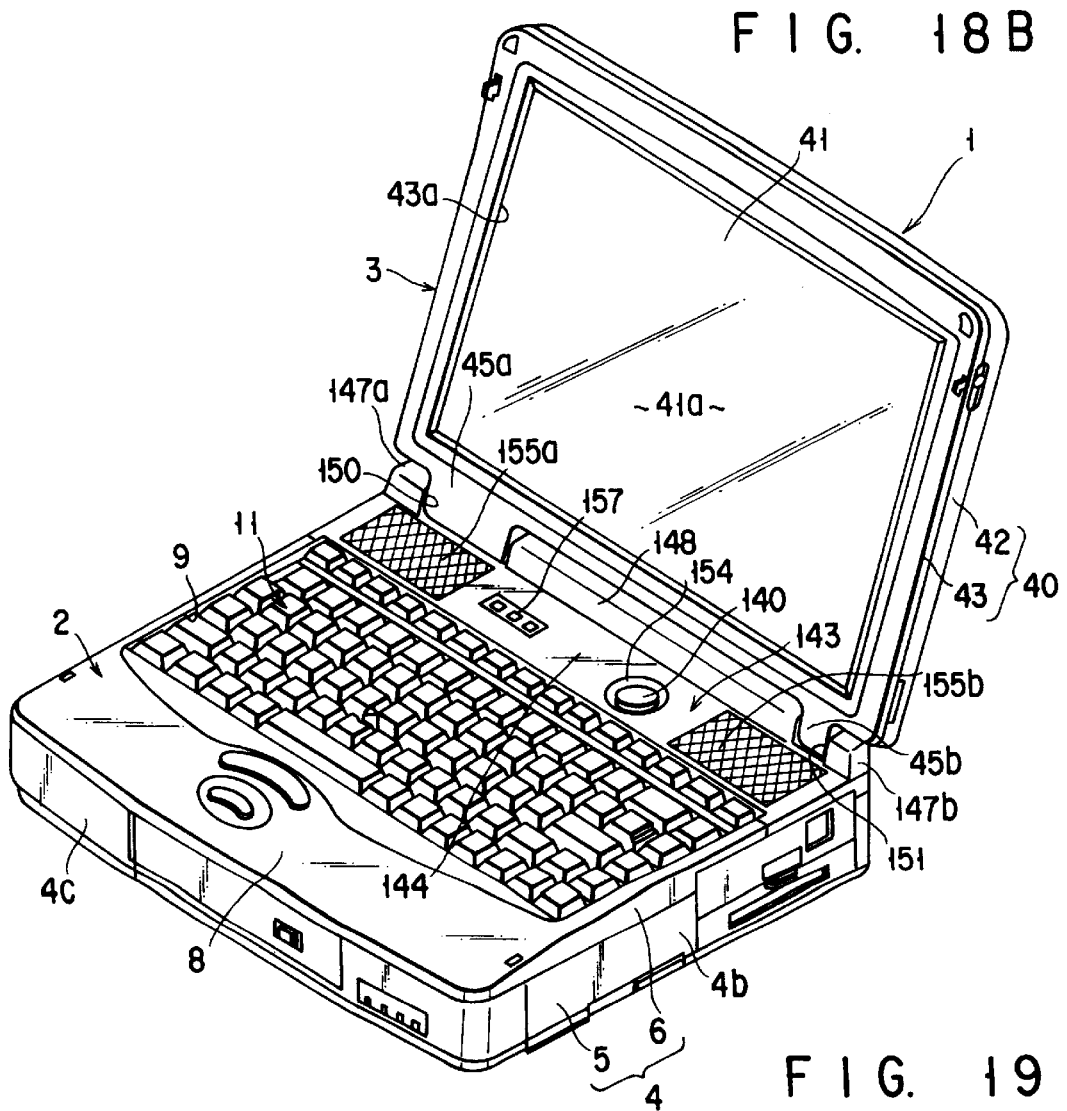
FIG. 19

ELECTRONIC APPARATUS WITH A CABLE EXTENDING BETWEEN MAIN BODY UNIT AND DISPLAY UNIT SUPPORTED ON THE MAIN BODY UNIT

BACKGROUND OF THE INVENTION

The present invention relates generally to an electronic apparatus such as a book-type portable computer, and more particularly to a structure for connecting a cable to a circuit board contained within a housing body of the apparatus.

A book-type portable computer comprises a main body unit having a keyboard, and a display unit supported on the main body unit. The main body unit has a box-shaped housing body. The housing body comprises a lower housing and an upper housing detachably coupled to the lower housing. The lower housing has a bottom wall and peripheral walls extending upward from peripheral edge portions of the bottom wall. The upper housing has a top wall on which the keyboard is mounted. The top wall is continuous with upper end portions of the peripheral walls and is opposed to the bottom wall. A circuit board is contained within the housing body. A number of IC chips and connectors are mounted on the circuit board. The circuit board is supported on the bottom wall of the lower housing.

The display unit comprises a display housing having a flat box shape, and a liquid crystal display (LCD) contained within the display housing. The display housing has leg portions extending toward the top wall of the upper housing. The leg portions are rotatably supported on a rear end portion of the housing body by means of hinge devices.

In this type of portable computer, the circuit board and the LCD are electrically connected to each other over a cable. The cable comprises a great number of lead lines. The cable has a first end portion with a first relay connector and a second end portion with a second relay connector. The first relay connector is connected to a connector of the circuit board, and the second relay connector is connected to a driver circuit of the LCD. The cable is guided into the housing body from the inside of the display housing through the leg portions.

The portable computer, wherein the connecting portion between the first relay connector of the cable and the connector of the circuit board is situated below the keyboard, has an opening portion for exposing the connector of the circuit board. The opening portion is formed in the top wall of the upper housing and is covered by the keyboard. Accordingly, after the upper housing is coupled to the lower housing, the first relay connector of the cable is connected to the connection on the circuit board through the opening portion of the upper housing. After the first relay connector is connected to the connector, the keyboard is mounted on the top wall.

In the case of a portable computer wherein the connecting portion between the first relay connector of the cable and the connector on the circuit board is situated in rear of the keyboard, this connecting portion is covered by the top wall of the upper housing. Thus, a first end portion of the cable is drawn out in advance to the lower side of the upper housing. The first relay connector continuous with the first end portion is connected to the connector on the circuit board before the upper housing is coupled to the lower housing.

In a conventional portable computer, the cable is passed through the coupling portion between the leg portions of the display housing and the housing body. The cable is thus guided into the housing body from a location behind the keyboard. As a result, in the case of the portable computer wherein the connecting portion between the first relay connector of the cable and the connector of the circuit board is situated below the keyboard, the cable guided to the rear end portion of the housing body needs to be drawn toward the front side of the housing body. Consequently, the cable extends over the circuit board and the length of the cable running within the housing body increases.

In addition, since high-speed signals flow through the cable, electromagnetic noise may be induced or coupled between the cable and the circuit pattern or circuit element on the circuit board. It is also possible that the cable itself may function as an antenna radiating noise. Thus, the noise radiated from the inside of the housing body increases, and electromagnetic shielding for the housing body needs to be strengthened.

Furthermore, since the cable extends from the rear end portion of the housing body toward the region below the keyboard, a space for passing the cable needs to be provided within the housing body. It is time-consuming to determine the arrangement of structural parts within the housing body and to connect the cable.

In the case of the portable computer wherein the connecting portion between the first relay connector of the cable and the connector on the circuit board is situated in rear of the keyboard, this connecting portion is covered by the top wall of the upper housing. It is thus necessary to connect the first relay connector to the connector on the circuit board in the state in which the upper housing is lifted up from the lower housing and the circuit board is exposed to the outside of the lower housing. In order to facilitate this connecting work, it is necessary to prepare a relatively long cable, and accordingly, the length of the cable running within the housing body increases. Such a cable may function as an antenna radiating noise. In addition, there is a need to provide a special space within the housing body in order to situate the cable. Because of these problems, it is difficult to reduce the size of the housing body.

BRIEF SUMMARY OF THE INVENTION

The object of the present invention is to provide an electronic apparatus wherein the length of a cable running within a housing body is reduced, noise radiated from the cable can be efficiently reduced, there is no need to provide a special space for receiving the cable within the housing body, the work for connecting the cable is facilitated, and the housing body can be reduced in size and thickness.

In order to achieve the object, the invention of provides an electronic apparatus comprising:
- a housing body;
- a circuit board contained within the housing body, the circuit board having a cable connector;
- a display unit having a display housing containing a display device, the display unit being supported on the housing body; and
- a cable having a first end portion and a second end portion, the cable extending between an inside of the housing body and an inside of the display housing, the first end portion being electrically connected to the cable connector, and the second end portion being electrically connected to the display device,
- wherein said housing body has an opening portion for exposing the cable connector, and the opening portion is covered by a removable cover.

According to this structure, since the cable connector is exposed to the outside of the housing body through the opening portion, the first end portion of the cable guided into the housing body can be connected to the cable connector through the opening portion.

Since the first end portion of the cable is located near the opening portion of the housing body, there is no need to introduce the cable deep into the housing body. Accordingly, the length of the cable running within the housing body can be decreased, and the cable is prevented from being extended over the circuit board. As a result, electromagnetic noise is not induced or coupled between the cable and the circuit board. In addition, the cable is prevented from functioning as an antenna radiating noise. Therefore, the noise radiated from the housing body can be efficiently reduced. Furthermore, since the length of the cable is decreased, the space for receiving the cable can be eliminated from the inside of the housing body.

In order to achieve the above object, the invention provides an electronic apparatus comprising:

a housing body having a display support portion on an upper surface thereof;

first and second circuit boards contained within the housing body, the second circuit board being electrically connected to the first circuit board and situated above the first circuit board;

a cable connector mounted on the second circuit board and contained within the housing body;

a display unit having a display housing containing a display device, the display unit being supported on the display support portion of the housing body; and a cable having a first end portion and a second end portion, the cable extending between an inside of the housing body and an inside of the display housing, the first end portion being electrically connected to the cable connector, and the second end portion being electrically connected to the display device, wherein said cable connector is situated near the display support portion, said housing body has an opening portion for exposing the cable connector, and said opening portion is covered by a detachable cover.

According to this structure, since the cable connector is situated above the first circuit board, the first end portion of the cable can be located as far as possible from the first circuit board. In addition, since the cable connector is situated adjacent to the display support portion of the housing body, the length of the cable introduced into the housing body can be more reduced. Accordingly, the cable is not extended over the first circuit board. The amount of radiated noise can be reduced, and the work for connecting the cable within the housing body can be facilitated.

In order to achieve the above object, the invention provides an electronic apparatus comprising:

a circuit board on which a cable connector and an extension connector are mounted;

a housing body containing the circuit board;

a display unit having a display housing containing a display device, the display unit being supported on the housing body; and a cable having a first end portion and a second end portion, the cable extending between an inside of the housing body and an inside of the display housing, the first end portion being electrically connected to the cable connector, and the second end portion being electrically connected to the display device, wherein said housing body includes:

an opening portion for exposing both the cable connector and the extension connector; and a first connector cover movable between a closed position where the first connector cover closes the opening portion and an open position where the first connector cover opens the opening portion, and said first connector cover includes:

a communication opening portion opposed to the extension connector when the first connector cover is situated in the closed position; and a second connector cover movable between a closed position where the second connector cover closes the communication opening portion and an open position where the second connector cover opens the communication opening portion.

In the above structure, when the first connector cover is shifted to the open position, the cable connector and extension connector are exposed to the housing body through the opening portion. Thus, the first end portion of the cable introduced into the housing body can be connected to the cable connector through the opening portion.

In addition, like the invention previously discussed, since the first end portion of the cable need not be introduced deep into the housing body, the length of the cable running within the housing body can be decreased. Thus, the cable is prevented from being extended over the circuit board. Therefore, the noise radiated from the housing body can be efficiently reduced. Furthermore, since the length of the cable is decreased, the space for receiving the cable can be eliminated from the inside of the housing body and the housing body can be reduced in size and thickness.

Besides, according to the above structure, even in the state in which the opening portion is closed by the first connector cover, if the second connector cover is opened, the extension connector alone can be exposed to the outside of the housing body through the communication opening portion. Thus, while the connected part between the cable and the cable connector is covered, a peripheral device such as a printer or a mouse can be connected to the extension connector.

In order to achieve the above object, the invention provides an electronic apparatus comprising:

a housing body including a leg attachment portion having a side surface provided with a first cable insertion port;

a circuit board contained within the housing body, the circuit board having a cable connector;

a display unit having a display housing containing a display device, the display housing having a leg portion situated in the leg attachment portion, the leg portion having a second cable insertion port communicating with the first cable insertion port; and a cable having a first end portion and a second end portion, the cable extending between an inside of the housing body and an inside of the display housing through the first and second cable insertion ports, the first end portion being electrically connected to the cable connector, and the second end portion being electrically connected to the display device, wherein the cable connector is situated near the leg attachment portion within the housing body, said housing body has an opening portion for exposing the cable connector, the leg attachment portion has a communication hole communicating with the first cable insertion port and serving to guide the cable into the first cable insertion port, the communication hole is covered by a detachable cover, and the cover has an extension for continuously covering the opening portion when the cover covers the communication hole.

In this structure, in order to introduce the cable into the housing body, the cover is removed in advance from the communication hole. The first end portion of the cable is inserted into the communication hole, and then the first end portion is guided into the housing body. The cable connector, to which the first end of the cable is to be connected, is exposed to the outside of the housing body through the opening portion near the leg attachment portion. Thus, the first end portion of the cable introduced into the housing body can be connected to the cable connector through the opening portion.

If the communication hole is covered by the cover after the cable is passed through the communication hole, the opening portion is closed by the extension of the cover. As a result, the connected part between the first end portion of the cable and the cable connector is hidden. Thus, there is no need to provide a special member for closing the opening portion or to perform a special work for closing the opening portion. Therefore, the work for assembling the apparatus is facilitated.

Since the cable connector and opening portion are located near the leg attachment portion, there is no need to introduce the first end portion of the cable deep into the housing body. Accordingly, the length of the cable running within the housing body can be decreased, and the cable is prevented from being extended over the circuit board. As a result, electromagnetic noise is not induced or coupled between the cable and the circuit board. In addition, the cable is prevented from functioning as an antenna radiating noise. Therefore, the noise radiated from the housing body can be efficiently reduced. Furthermore, since the length of the cable is decreased, the space for receiving the cable can be eliminated from the inside of the housing body, and the housing body can be reduced in size and thickness.

In order to achieve the above object, the invention provides an electronic apparatus comprising:

a housing body having a leg attachment portion and an opening portion formed at a position adjacent to the leg attachment portion;

a circuit board contained within the housing body, said circuit board having a cable connector at a position facing the opening portion;

a display unit having a display housing containing a display device, the display housing having a leg portion situated in the leg attachment portion, said leg portion having a first cable insertion port communicating with an inside of the display housing;

a cover detachably attached to the housing body to cover the opening portion, the cover cooperating with the housing body to form a cable container communicating with the opening portion, said cover having a second cable insertion port for communication between the first cable insertion port and the cable container; and a cable having a first end portion and a second end portion, the cable extending between an inside of the housing body and an inside of the display housing through the first and second cable insertion ports and the cable container, the first end portion being electrically connected to the cable connector, and the second end portion being electrically connected to the display device.

According to this structure, since the cable connector is exposed to the outside of the housing body through the opening portion, the first end portion of the cable can be connected to the cable connector through the opening portion.

After the first end portion of the cable is connected to the cable connector, the cover for covering the opening portion is attached to the housing body. Accordingly, the cable drawn out of the first cable insertion port of the leg portion is contained in the cable container defined by the housing body and the cover. Thus, there is no need to introduce the cable deep into the housing body, and the cable is prevented from being extended over the circuit board. As a result, electromagnetic noise is not induced or coupled between the cable and the circuit board. In addition, the cable is prevented from functioning as an antenna radiating noise. Therefore, the noise radiated from the housing body can be efficiently reduced. Furthermore, since the length of the cable is decreased, the space for receiving the cable can be eliminated from the inside of the housing body, and the housing body can be reduced in size and thickness.

Besides, according to this structure, the cable drawn out of the first cable insertion port of the leg portion may merely be covered by the cover. There is no need to form a hole for passing the cable in the leg attachment portion, or to perform a time-consuming work for passing the cable through this hole.

In order to achieve the above object, the invention provides an electronic apparatus comprising:

a housing body having a top wall;

a circuit board contained within the housing body, the circuit board having a cable connector;

a keyboard placed on the top wall of the housing body;

a component attachment portion formed on the top wall of the housing body and supporting a plurality of functional components, the component attachment portion being located behind the keyboard and having an opening portion for exposing the cable connector;

a display unit having a display housing containing a display device, the display unit being supported on a rear end portion of the housing body which is continuous with the component attachment portion;

a cable having a first end portion and a second end portion, the cable extending between an inside of the housing body and an inside of the display housing, the first end portion being electrically connected to the cable connector, and the second end portion being electrically connected to the display device; and a top cover detachably supported on the component attachment portion of the housing body, the top cover covering the functional components, the opening portion and the cable.

According to this structure, since the cable connector is exposed to the component attachment portion of the housing body through the opening portion, the first end portion of the cable introduced into the housing body can be connected to the cable connector through the opening portion.

Since the cable connector and opening portion are located at the rear end portion of the housing body, there is no need to introduce the cable deep into the housing body. Thus, the length of the cable running within the housing body can be decreased, and the cable is prevented from being extended over the circuit board. As a result, electromagnetic noise is not induced or coupled between the cable and the circuit board. In addition, the cable is prevented from functioning as an antenna radiating noise. Therefore, the noise radiated from the housing body can be efficiently reduced. Furthermore, since the length of the cable is decreased, the space for receiving the cable can be eliminated from the inside of the housing body, and the housing body can be reduced in size and thickness.

Besides, since the opening portion is covered by the top cover for covering the functional components, there is no need to provide a special member for closing the opening portion or to perform a special work for closing the opening portion. Therefore, the work for assembling the apparatus is facilitated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a perspective view of the portable computer, showing the state in which a cover is removed from the opening in the housing body;

FIG. 3 is a cross-sectional view of the portable computer, showing a path along which the cable runs;

FIG. 8 is a perspective view of the portable computer, showing the state in which the first connector cover is rotated to its opening position and the opening in the housing body is exposed;

FIG. 9 is a perspective view of a portable computer according to a fifth embodiment of the invention, showing the state in which a cable cover is removed from the housing body;

FIG. 18A is a cross-sectional view showing the state in which a communication hole in the upper housing is closed by the hinge cover;

FIG. 18B is a cross-sectional view showing the state in which the communication hole in the upper housing is closed by the hinge cover;

FIG. 19 is a perspective view of a portable computer according to a seventh embodiment of the invention;

DETAILED DESCRIPTION OF THE INVENTION

A portable computer according to a first embodiment of the present invention will now be described with reference to FIGS. 1 to 4.

Figure 1:
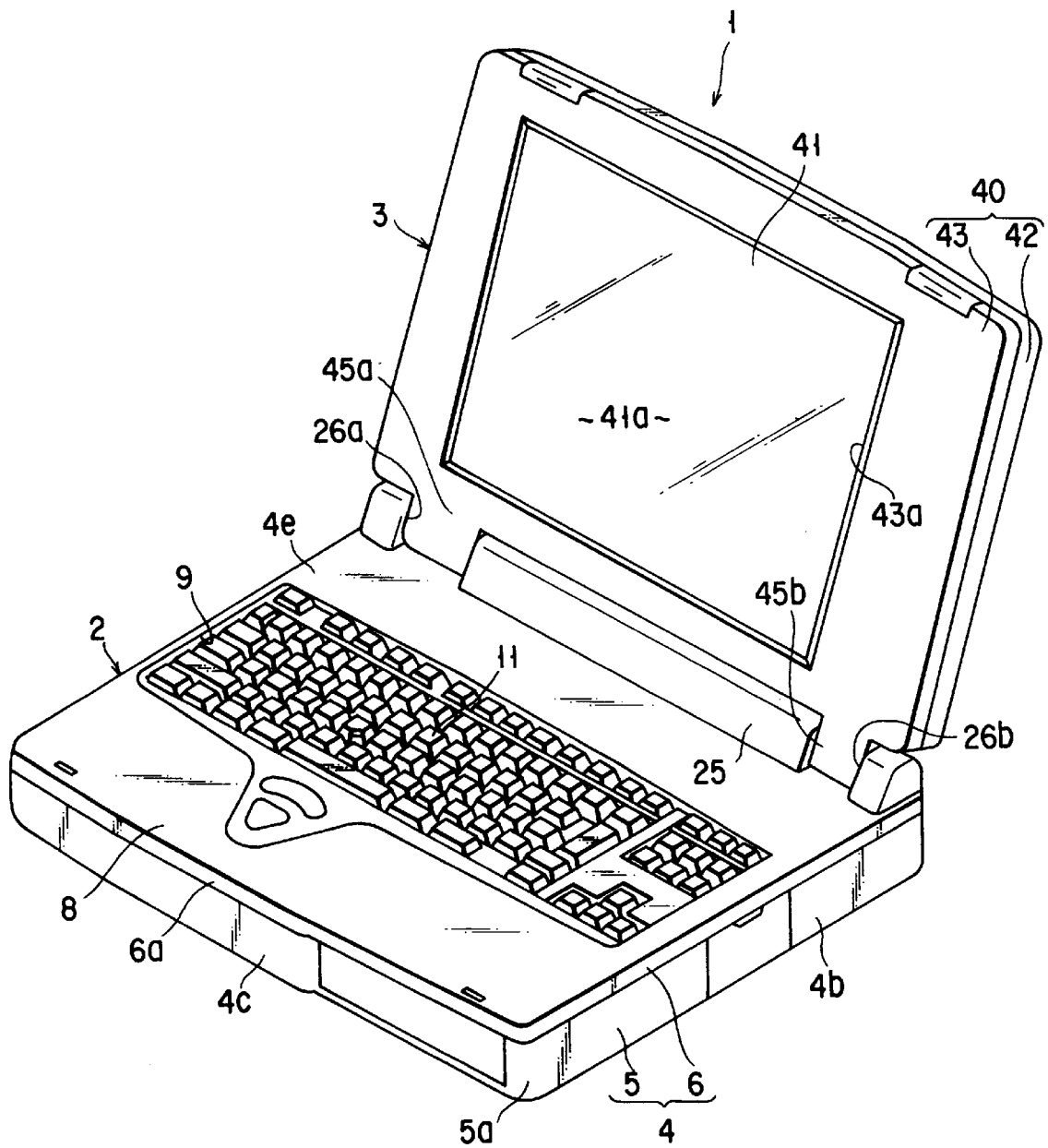
FIG. 1 is a perspective view showing a portable computer according to a first embodiment of the present invention.

FIG. 1 shows a book-type portable computer 1. The computer 1 comprises a main body unit 2 and a display unit 3 supported on the main body unit 2. The main body unit 2 includes a flat box-shaped housing body 4 formed of a synthetic resin. The housing body 4 includes a bottom wall 4a, a pair of side walls 4b (only one shown), a front wall 4c, a rear wall 4d, and a top wall 4e. The side wall 4b, front wall 4c and rear wall 4d are continuous with the bottom wall 4a and top wall 4e. The bottom wall 4a and top wall 4e are opposed to each other.

The housing body 4 comprises a lower housing 5 and an upper housing 6. The lower housing 5 has the bottom wall 4a and four peripheral walls 5a extending upward from peripheral edges of the bottom wall 4a. The upper housing 6 is detachably attached to the lower housing 5. The upper housing 6 has the top wall 4e and four peripheral walls 6a extending downward from peripheral edges of the top wall 4e. The peripheral walls 5a of lower housing 5 and peripheral walls 6a of upper housing 6 cooperate to constitute the side walls 4b, front wall 4c and rear wall 4d of the housing body 4.

The top wall 4e of the housing body 4 has a palm-rest 8 and a keyboard mount portion 9. The palm-rest 8 extends in the width direction of the housing body 4 at a front end portion of the housing body 4. The keyboard mount portion 9 is situated behind the palm-rest 8. The keyboard mount portion 9 is formed as a recess retreating toward the inside of the housing body 4. A keyboard 11 is situated in the keyboard mount portion 9.

As is shown in FIG. 3, a first circuit board 13 functioning as a main board and a second circuit board 14 functioning as a relay board are contained within the housing body 4. The first circuit board 13 is supported on the bottom wall 4a of lower housing 5 and is situated in parallel to the bottom wall 4a. Various circuit elements 15 such as a DRAM and a functional component 16 such as a card connector are mounted on the first circuit board 13. The first circuit board 13 has a rear end portion 13a adjacent to the rear wall 4d. At least one extension connector 17 is mounted on the upper surface of the rear end portion 13a. The extension connector 17 is used for detachable connection with a peripheral device (not shown) such as a printer or a mouse. The extension connector 17 is exposed to the rear side of the housing body 4 through a connector hole 18 formed in the rear wall 4b. The extension connector 17 is covered by a connector cover 20. The connector cover 20 is supported on the rear wall 4d so as to be rotatable between a closed position where the connector hole 18 is closed and an opening position where the connector hole 18 is opened.

As is shown in FIG. 3, the second circuit board 14 is electrically connected to the first circuit board 13 via a stacking connector 22. The stacking connector 22 mechanically connects the first circuit board 13 and second circuit board 14. The second circuit board 14 is situated in parallel to the first circuit board 13 above the rear end portion of the first circuit board 13. Accordingly, the second circuit board 14 is located at a rear end portion of the housing body 4. A cable connector 23 is mounted on the upper surface of the second circuit board 14.

As is shown in FIGS. 1 to 4, the housing body 4 has an projecting portion 25 projecting upward from a rear end portion of the upper wall 4e. The projecting portion 25 extends in the width direction of the housing body 4. This projecting portion 25 has such a hollow shape as to communicate with the inside of the housing body 4. The second circuit board 14 is situated below the projecting portion 25.

The projecting portion 25 has first and second leg attachment portions 26a and 26b. Each of the first and second leg attachment portions 26a and 26b is formed as a recess opening continuously to the front, above and rear sides of the projecting portion 25. The first and second leg attachment portions 26a and 26b are spaced apart in the width direction of the housing body 4. The first and second leg attachment portions 26a and 26b have common structures. Thus, the first leg attachment portion 26a located on the left-hand side of the housing body 4 may be described representatively.

Figure 4:
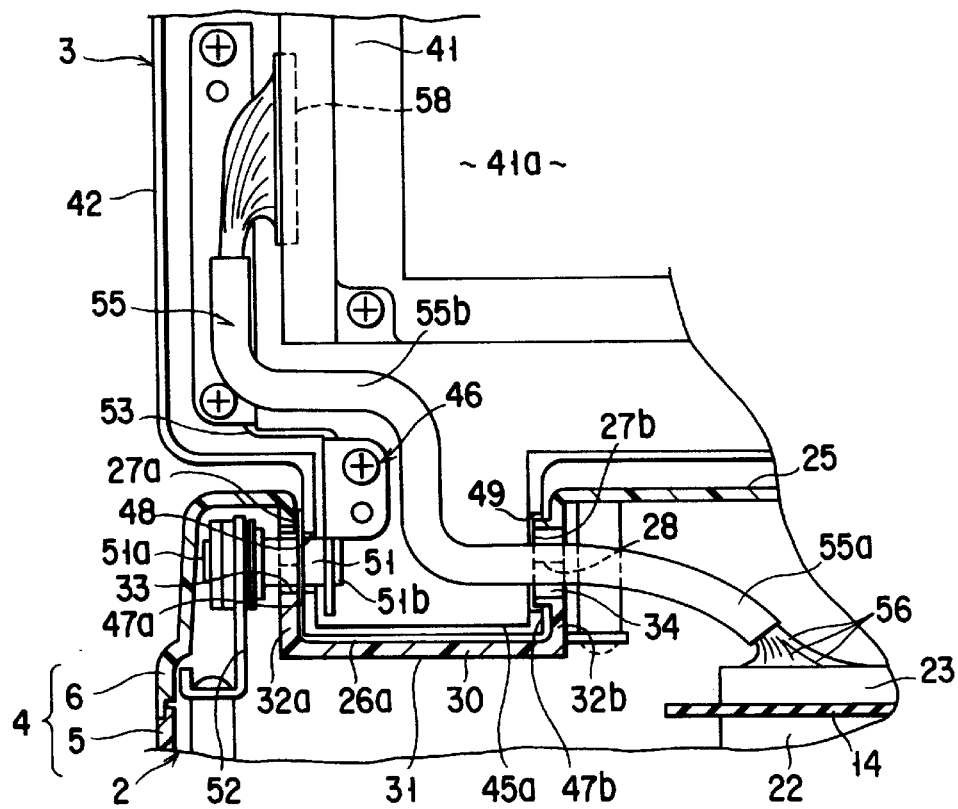
FIG. 4 is a cross-sectional view of the portable computer, showing a positional relationship between the path of the cable and a hinge device.

As is shown in FIG. 4, the first leg attachment portion 26a has a pair of side surfaces 27a and 27b and a communication hole 28. The side surfaces 27a and 27b extend upward from the top wall 4e of the upper housing 6 and are spaced apart in the longitudinal direction of the projecting portion 25. The communication hole 28 opens to the top wall 4e of upper housing 6. The communication hole 28 is located between the side surfaces 27a and 27b and communicates with the inside of the housing body 4.

The communication hole 28 is covered by a detachable hinge cover 30. The hinge cover 30 is fitted in the communication hole 28 so as to cover the communication hole 28 from the inside of the housing body 4. The hinge cover 30 is screwed to the upper housing 6. The hinge cover 30 has a bottom wall 31 and first and second side walls 32a and 32b continuous with the bottom wall 31. The bottom wall 31 is continuous with the top wall 4e of housing body 4. The first and second side walls 32a and 32b are continuous with lower end portions of the side surfaces 27a and 27b of the first leg attachment portion 26a. The first side wall 32a cooperates with the lower end portion of the side surface 27a to define a first communication port 33. The second side wall 32b cooperates with the lower end portion of the other side surface 27b to define a first cable insertion port 34. The communication port 33 and first cable insertion hole 34 are coaxially located and communicate with the inside of the projecting portion 25.

As is shown in FIGS. 3 and 4, the cable connector 23 on the second circuit board 14 is situated adjacent to the first cable insertion port 34 and the rear wall 4d of housing body 4. The rear wall 4d has an opening portion 36 facing the cable connector 23. The opening portion 36 has a rectangular shape with an opening greater than the cable connector 23. Accordingly, the cable connector 23 is exposed to the rear side of the housing body 4 through the opening portion 36.

The opening portion 36 is covered by a detachable cover 37. The cover 37 has a flat plate-like shape with such a size as to permit tight fitting in the opening portion 36. The cover 37 has a pair of engaging claws 38a and 38b. The engaging claws 38a and 38b are detachably hooked at an opening peripheral portion of the opening portion 36. Thus, the cover 37 is held at the rear wall 4d of housing body 4 in the state in which the opening portion 36 is closed by the cover 37.

As is shown in FIGS. 3 and 4, the display unit 3 comprises a flat box-shaped display housing 40 formed of a synthetic resin and a liquid crystal display (LCD) 41 contained in the display housing 40. The display housing 40 comprises a display cover 42 and a display mask 43 coupled to the display cover 42. The display mask 43 has a front face in which a display opening portion 43a is formed. The LCD 41 is fixed to the display cover 42. The LCD 41 has a display screen 41a for displaying information such as characters or figures. The display screen 41a is exposed to the outside of the display housing 40 through the opening portion 43a.

The display housing 40 has first and second leg portions 45a and 45b extending from an end portion of the display housing 40 toward the top wall 4e of housing body 4. The first and second leg portions 45a and 45b are spaced apart in the width direction of the display housing 40, and each of them has a hollow shape and communicates with the inside of the display housing 40.

The first and second leg portions 45a and 45b are inserted in the first and second leg attachment portions 26a and 26b. The first and second leg portions 45a and 45b are supported on the housing body 4 by means of hinge devices 46 respectively. Since common support structures are adopted for the first and second leg portions 45a and 45b, the support structure for the first leg portion 45a may be described representatively.

As is shown in FIG. 4, the first leg portion 45a has a pair of side surfaces 47a and 47b. One of the side surfaces, 47a, faces one of the side surfaces, 27a, of the first leg attachment portion 26a. This side surface 47a has a second communication port 48. The second communication port 48 communicates with the first communication port 33 in the first leg attachment portion 26a. The other side surface 47b faces the other side surface 27b of the first leg attachment portion 26a. This side surface 47b has a second cable insertion port 49. The second cable insertion port 49 communicates with the first cable insertion port 34 in the first leg attachment portion 26a.

The hinge device 46 comprises a hinge shaft 51 and first and second brackets 52 and 53. The hinge shaft 51 has a first end portion 51a and a second end portion 51b. The hinge shaft 51 is passed through the first and second communication ports 33 and 48 and situated horizontal. The hinge shaft 51 extends in the width direction of the housing body 4. Thus, the first end portion 51a of hinge shaft 51 is introduced into the left-hand end portion of the projecting portion 25, and the second end portion 51b is into the inside of the first leg portion 45a.

The first bracket 52 is rotatably coupled to the first end portion 51a of hinge shaft 51. The first bracket 52 is contained within the housing body 4 and screwed to the lower housing 5 of housing body 4. The second bracket 53 is fixed to the second end portion 51b of hinge shaft 51. The second bracket 53 is contained within the display housing 40. The second bracket 53 is screwed to the display cover 42 of display housing 40.

Accordingly, the display unit 3 is supported on the housing body 4 such that the display unit 3 is rotatable on the hinge shaft 51 between a position where it covers the palm-rest 8 and keyboard 11 and a position where it exposes the palm-rest 8 and keyboard 11.

As is shown in FIG. 2 to 4, the second circuit board 14 and the LCD 41 are electrically connected over a cable 55. The cable 55 is a combination of a number of flexible lead lines 56. The cable 55 has a first end portion 55a led into the housing body 4 and a second end portion 55b led into the display housing 40. A first connector 57 is connected to the first end portion 55a of the cable 55. A second connector 58 is connected to the second end portion 55b of cable 55.

The cable 55 is passed through the first and second cable insertion ports 34 and 49 and extends between the inside of the housing body 4 and the inside of the display housing 40. The first end portion 55a of cable 55 is guided into the projecting portion 25 of housing body 4 through the communication hole 28 before the hinge cover 30 is attached to the upper housing 6. When the communication hole 28 is covered by the hinge cover 30, the cable 55 is passed through the first cable insertion port 34 defined by the second side wall 32b of hinge cover 30 and the side surface 27b of the first leg attachment portion 26a.

The cable connector 23 on the second circuit board 14 is situated adjacent to the first cable insertion port 34. The first connector 57 of cable 55 is guided toward the cable connector 23 from behind the second circuit board 14 in a region near the first leg attachment portion 26a, and thus the first connector 57 is electrically connected to the cable connector 23. The connected part of the connectors 23 and 57 is opposed to the opening portion 36 in the housing body 4 and is covered by the cover 37.

That part of the cable 55, which is continuous with the second end portion 55b, is passed through the first leg portion 45a and guided into the display housing 40. The second connector 58 of cable 55 is electrically connected to a driver circuit unit of the LCD 41.

A description will now be given of the procedure for connecting the first connector 57 of cable 55 to the cable connector 23 on the second circuit board 14 in the portable computer 1 with the structure as described above.

Before the cable 55 is introduced into the housing body 4, the lower housing 5 and upper housing 6 are separated from each other. In addition, the hinge cover 30 is removed from the upper housing 6, and the communication hole 28 in the first leg attachment portion 26a is opened. In this state, the first end portion 55a of cable 55 is introduced into the housing body 4 through the communication hole 28. Subsequently, the hinge cover 30 is fitted in the communication hole 28 from the inside of the upper housing 6, and the communication hole 28 is closed by the hinge cover 30.

At this time, the cable 55 inserted into the communication hole 28 is guided by the second side wall 32b of hinge cover 30 and led into the second cable insertion port 49 defined by this second side wall 32b and the side surface 27b of first leg attachment portion 26a. Thus, the first end portion 55a of cable 55 is guided into the projecting portion 25 continuous with the first leg attachment portion 26a, and the first connector 57 is situated near the opening 36 in the housing body 4.

Then, the upper housing 6 and lower housing 5 are coupled and the housing body 4 is assembled. Thereby, the cable connector 23 on the second circuit board 14 is opposed to the opening portion 36 and exposed to the outside of the housing body 4 through the opening portion 36. In this state, the fingers or a tool is inserted in the opening portion 36. The first connector 57 of cable 55 guided to the vicinity of the opening portion 36 is held by the fingers or the tool and coupled to the cable connector 23.

Finally, the cover 37 is fitted in the opening portion 36 and the engaging claws 38a and 38b are hooked at the opening peripheral portion of the opening portion 36. Thus, the connected part of the cable connector 23 and first connector 57 is covered by the cover 37, and the procedure for connection between the second circuit board 14 and LCD 41 is completed.

According to the above-described portable computer 1, the cable connector 23 and the opening portion 36 for exposing the cable connector 23 are located adjacent to the first leg attachment portion 26a in which the first leg portion 45a of display unit 3 is inserted. Accordingly, the distance between the first cable insertion port 34 in the first leg attachment portion 26a and the cable connector 23 is reduced. Thus, there is no need to introduce the cable 55 from the first leg portion 45a deep into the housing body 4, and the path for wiring the cable 55 within the housing body 4 can be decreased.

Besides, the cable connector 23 is mounted on the second circuit board 14 separated from the first circuit board 13, and this second circuit board 14 is situated above the first circuit board 13. It is thus possible to situate the cable 55 introduced in the housing body 4 as away as possible from the first circuit board 13. Unlike the prior art, the cable 55 is not extended over the first circuit board 13. Therefore, it is possible to surely prevent induction or coupling of electromagnetic noise between the cable 55 and the first circuit board 13, and to prevent the cable 55 from functioning as an antenna radiating noise. As a result, noise radiated from the housing body 4 can be efficiently reduced without strengthening the electromagnetic shield of the housing body 4.

Furthermore, the cable 55 is contained within the projecting portion 25 at the rear end of the housing body 4. There is no need to provide a space for receiving the cable 55 between the first circuit board 13 and the top wall 4e of upper housing 6 or between the first circuit board 13 and keyboard 11. Therefore, the housing body 4 can be reduced in size and the portability of the portable computer 1 can be enhanced.

Figure 5:
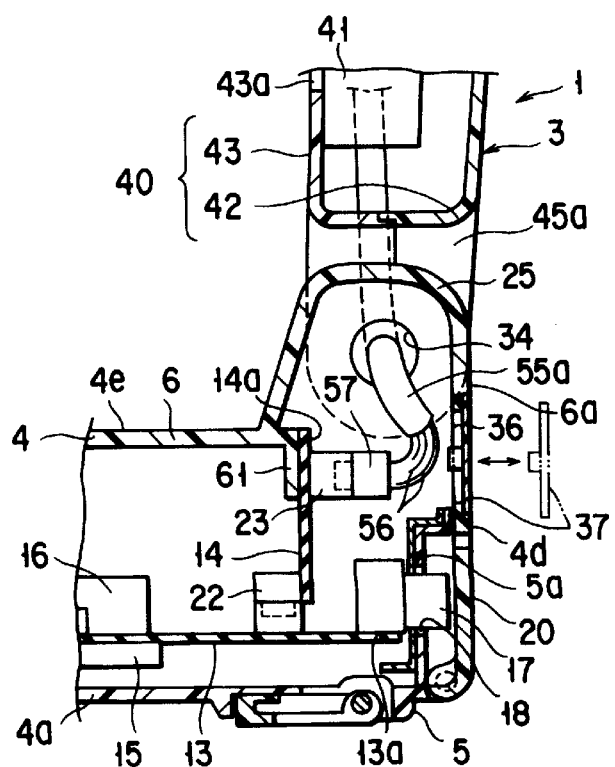
FIG. 5 is a cross-sectional view of a portable computer, showing a path of a cable according to a second embodiment of the invention.

The present invention is not limited to the above-described first embodiment. FIG. 5 shows a second embodiment of the present invention. The second embodiment mainly differs from the first embodiment with respect to the position of the second circuit board 14. In the other structural features, both embodiments are substantially the same. In the second embodiment, the structural elements common to those in the first embodiment are denoted by like reference numerals, and a description thereof is omitted.

As is shown in FIG. 5, the second circuit board 14 is situated in a vertical position below the projecting portion 25. Accordingly, the second circuit board 14 has a rear surface 14a facing the rear wall 4d of housing body 4. The cable connector 23 is mounted on an upper part of the rear surface 14a.

A support wall 61 is formed at a rear end portion of the top wall 4e of upper housing 6. The support wall 61 supports, from the side, an upper part of the second circuit board 14 in a position corresponding to the cable connector 23. Thus, the support wall 61 receives the pressure applied to the second circuit board 14 when the cable connector 23 is connected to the first connector 57. Accordingly, a result, no undesirable force acts on the second circuit board 14 or stacking connector 22, and the second circuit board 14 and stacking connector 22 are prevented from being broken.

Figure 6:
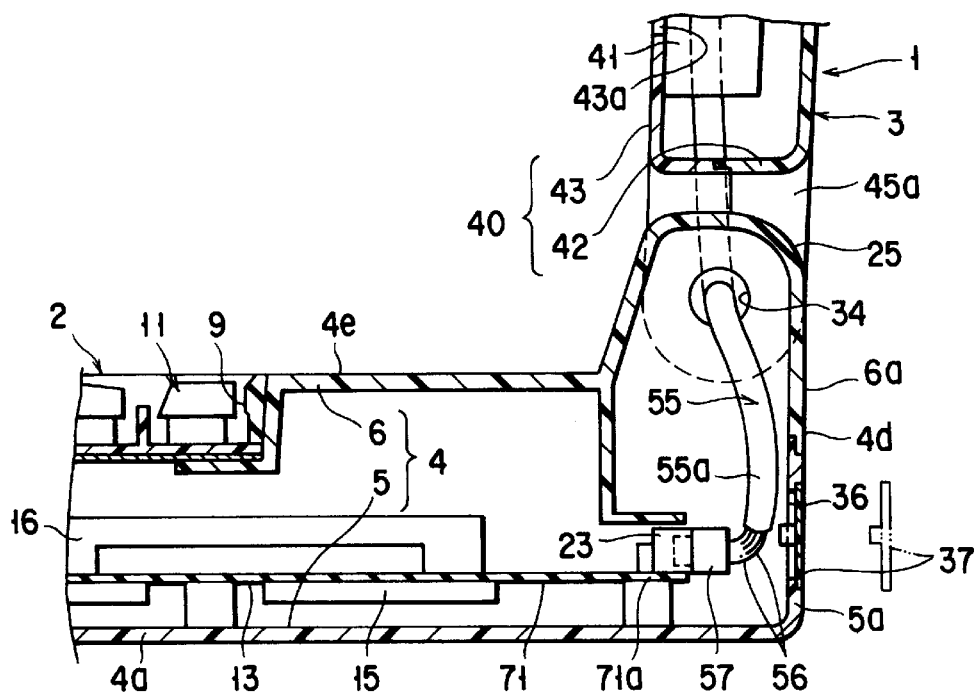
FIG. 6 is a cross-sectional view of a portable computer, showing a path of a cable according to a third embodiment of the invention.

FIG. 6 shows a third embodiment of the present invention. The third embodiment is a development from the first embodiment, and the basic structure of the portable computer 1 is the same as that of the first embodiment.

Specifically, as shown in FIG. 6, a main circuit board 71 is contained within the housing body 4. The circuit board 71 is supported on the bottom wall 4a of lower housing 5. The circuit board 71 has a rear end portion 71a located below the projecting portion 25. The rear end portion 71a faces the rear wall 4d of housing body 4. The cable connector 23 is mounted on the upper surface of the rear end portion 71a of circuit board 71. The cable connector 23 is located below the first cable insertion port 34 in the first leg attachment portion 26a within the housing body 4. The cable connector 23 is opposed to a lower portion of the rear wall 4d of housing body 4. The opening portion 36 is formed in the lower portion of the rear wall 4d. The opening portion 36 is covered by the detachable cover 37.

As is shown in FIG. 6, the first end portion 55a of cable 55 introduced into the projecting portion 25 through the first cable insertion port 34 is guided directly to a region below the projecting portion 25. The first connector 57 of cable 55 is guided from behind the circuit board 71 toward the cable connector 23 and coupled to the cable connector 23. The connected part of the connectors 23 and 57 is opposed to the opening portion 36 and covered by the cover 37.

According to this structure, the cable 55 introduced into the housing body 4 from the first cable insertion port 34 is merely guided to the region below the projecting portion 25. The cable 55 is not introduced into the housing body 4 in such a manner that it extends over the circuit board 71. Thus, the path for extending the cable 55 within the housing body 4 can be reduced, and the same advantage as in the first embodiment can be obtained.

Figure 7:
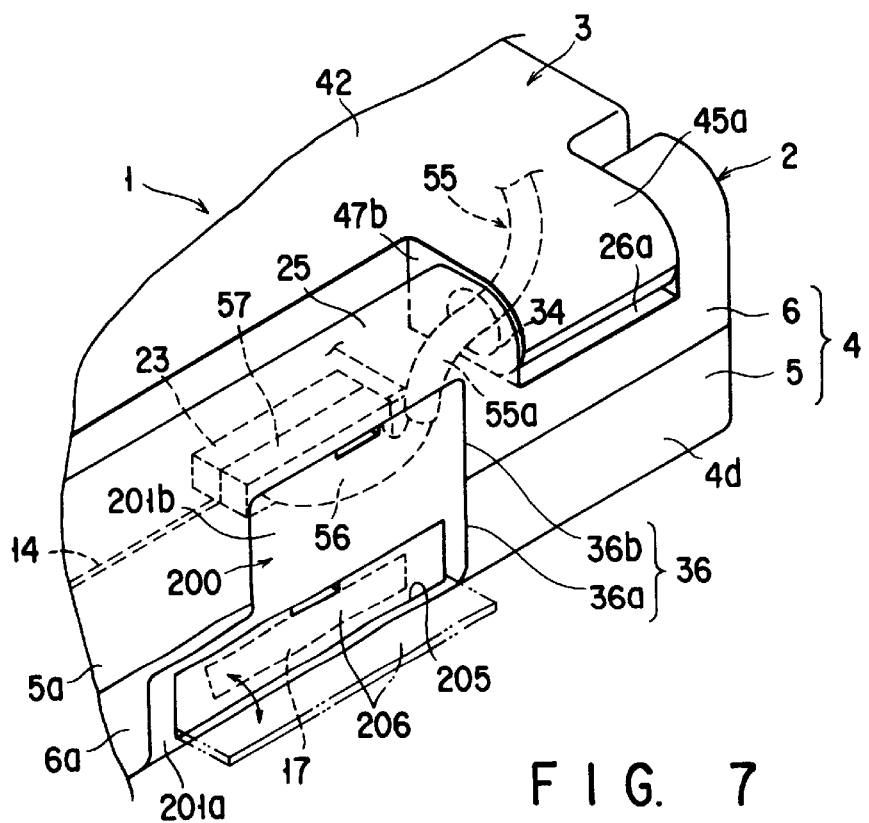
FIG. 7 is a perspective view of a portable computer according to a fourth embodiment of the invention, showing the state in which a first connector cover is rotated to its closed position and the opening in the housing body is closed by the first connector cover.

FIGS. 7 and 8 show a fourth embodiment of the invention. The fourth embodiment differs mainly from the first embodiment with respect to the structure for exposing the cable connector 23 and extension connector 17. In the other respects, the basic structure of the portable computer 1 according to the fourth embodiment is the same as that of the portable computer according to the first embodiment.

As is shown in FIG. 8, the opening portion 36 in the housing body 4 comprises a first opening portion 36a formed in the peripheral wall 5a of lower housing 5, and a second opening portion 36b formed in the peripheral wall 6a of upper housing 6. The first opening portion 36a is opposed to the extension connector 17 so that the extension connector 17 is exposed to the rear side of the housing body 4. The second opening portion 36b is opposed to the cable connector 23 so that the cable connector 23 is exposed to the rear side of the housing body 4. The first and second opening portions 36a and 36b communicate with each other.

A plate-like first connector cover 200 is supported on the lower housing 5 of housing body 4. The first connector cover 200 comprises a first cover portion 201a and a second cover portion 201b. The first cover portion 201a has such a size as to be fitted in the first opening portion 36a. The second cover portion 201b has such a size as to be fitted in the second opening portion 36b. The first cover portion 201a has an end portion continuous with a lower end portion of the lower housing 5. This end portion of first cover portion 201a is provided with a pair of support portions 202a and 202b. The support portions 202a and 202b are rotatably supported on the lower end portion of the lower housing 5 by means of pivot shafts 203. Accordingly, the first connector cover 200 can be rotated on the pivot shafts 203 between a closed position where the cover 200 closes the opening portion 36 and an open position where it opens the opening portion 36.

As is shown in FIG. 7, when the first connector cover 200 is rotated and set in the closed position, the first connector cover 200 is continuous with the rear wall 4d of housing body 4 and covers both connectors 17 and 23. As is shown in FIG. 8, in the state in which the first connector cover 200 is rotated and set in the open position, the first connector cover 200 falls away from the rear side of the housing body 4 to be substantially horizontal. Thus, the connectors 17 and 23 are exposed to the rear side of the housing body 4 through the opening portion 36.

The first cover portion 201a of first connector cover 200 has a communication hole 205. The communication hole 205 is formed in such a position that the communication hole 205 faces the extension connector 17 when the first connector cover 200 has been set in the closed position. A plate-like second connector cover 206 is supported on the first cover portion 201a. The second connector cover 206 has such a size that it can be fitted in the communication hole 205. The second connector cover 206 has a pair of support portions 207a and 207b. The support portions 207a and 207b are rotatably supported on bracket portions 209a and 209b of the first cover portion 201a by means of pivot shafts 208. Accordingly, the second connector cover 206 can be rotated on the pivot shafts 208 between a closed position for closing the communication hole 205 and an open position for opening the communication hole 205.

In the above structure, when the first connector cover 200 is rotated and set in the open position, the cable connector 23 and extension connector 17 are exposed to the rear side of the housing body 4 through the opening portion 36. Like the first embodiment, in the state in which the housing body 4 has been assembled, the fingers or a tool is inserted into the first portion 36a of opening portion 36. Thereby, the first connector 57 of cable 55 can be held by the fingers or tool and connected to the cable connector 23.

Even in the state in which the opening portion 36 is closed by the first connector cover 200, if the second connector cover 206 is independently rotated to the open position, the communication hole 205 in the first connector cover 200 is opened. Accordingly, the extension connector 17 can be exposed to the rear side of the housing body 4 through the communication hole 205. While the connected part between the cable 55 and cable connector 23 is covered by the first connector cover 200, a peripheral device such as a printer or a mouse can be connected to the extension connector 17 through the communication hole 205.

According to this structure, there is no need to provide a special member for covering the cable connector 23 or to perform a work for attaching this member to the housing body 4. Therefore, the assembling work for the housing body 4 can be easily carried out.

FIGS. 9 to 12 show a fifth embodiment of the present invention.

The fifth embodiment differs from the first embodiment with respect to the path of insertion of the cable 55 drawn out of the first leg portion 45a. In the other respects, the basic structure of the portable computer 1 is the same as that of the portable computer according to the first embodiment.

As is shown in FIG. 9, the first leg attachment portion 26a of housing body 4 is opened continuously to the front side, rear side and left side of the housing body 4. The first leg attachment portion 26a has a side surface 81 continuous with the left-hand end portion of the projecting portion 25 and a bottom surface 82 continuous with the side surface 81. The bottom surface 82 is continuous with the upper surface of the top wall 4e of upper housing 6.

Figure 11:
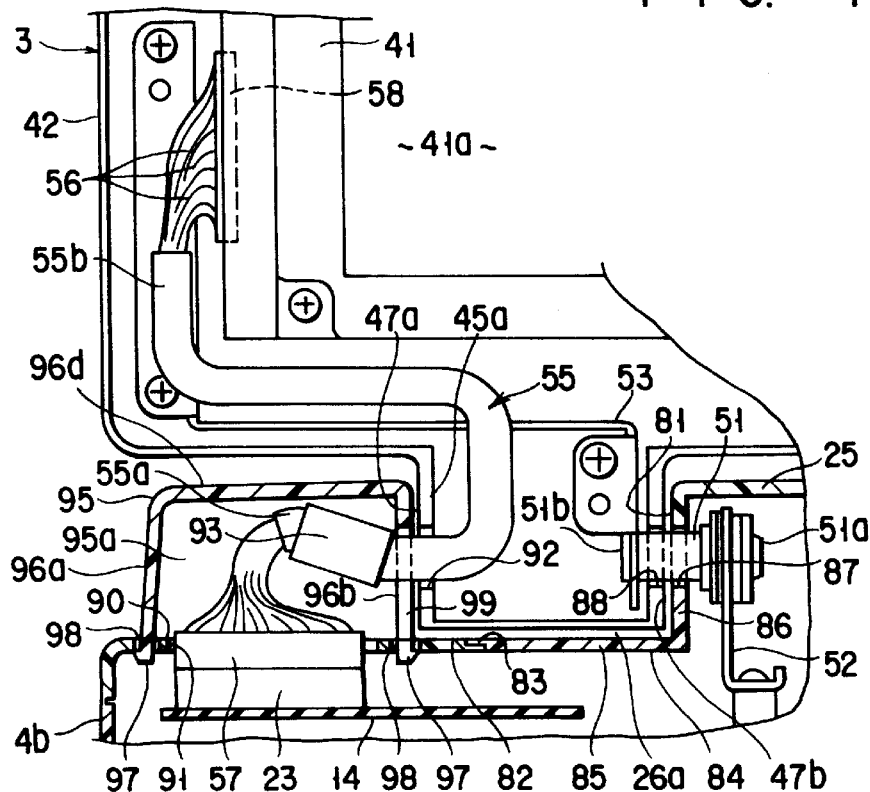
FIG. 11 is a cross-sectional view of the portable computer, showing a positional relationship between the path of the cable and a hinge device.
Figure 12:
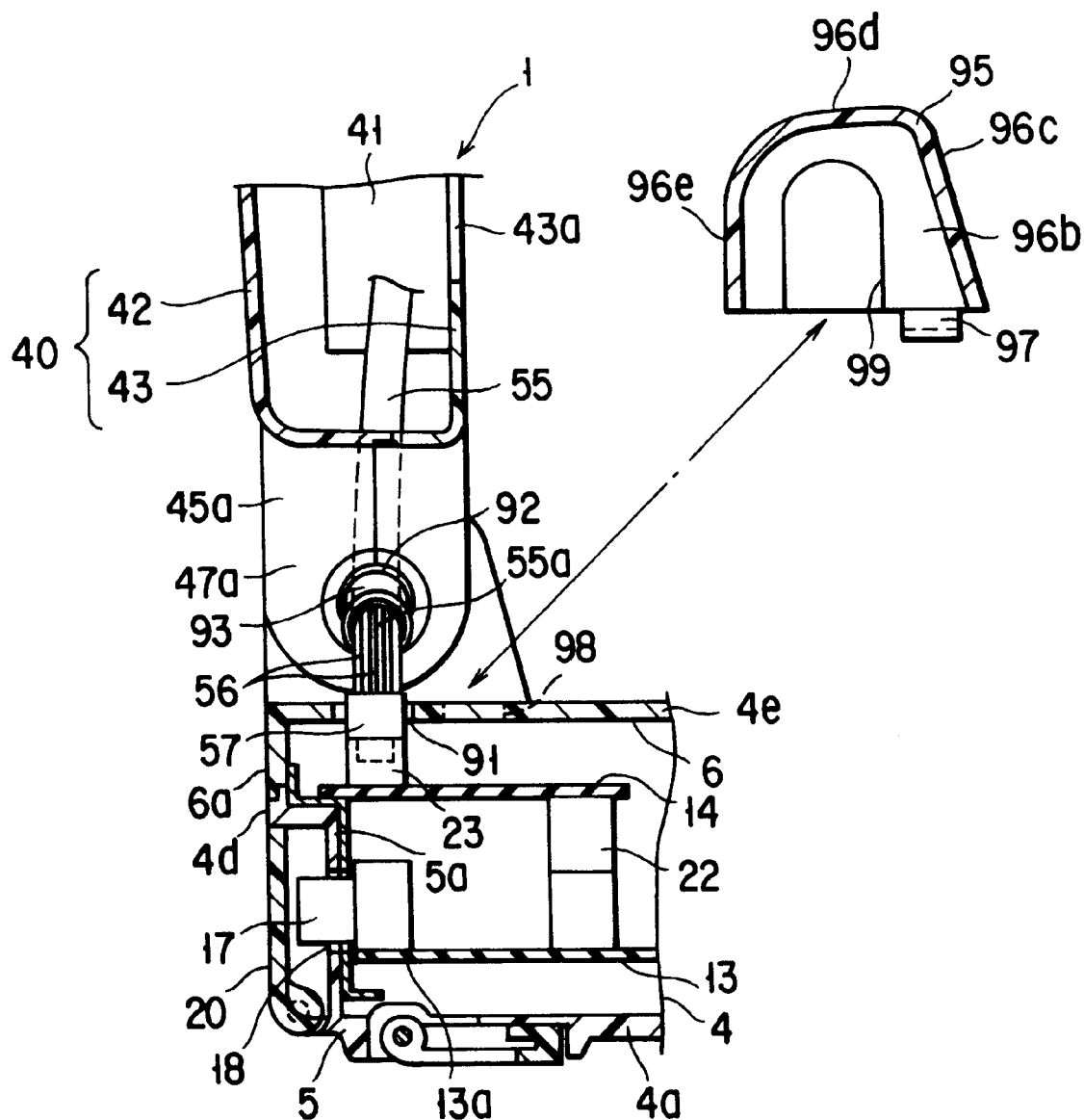
FIG. 12 is a cross-sectional view of the portable computer, showing the state in which the cable cover is removed from the housing body.
Figure 13:
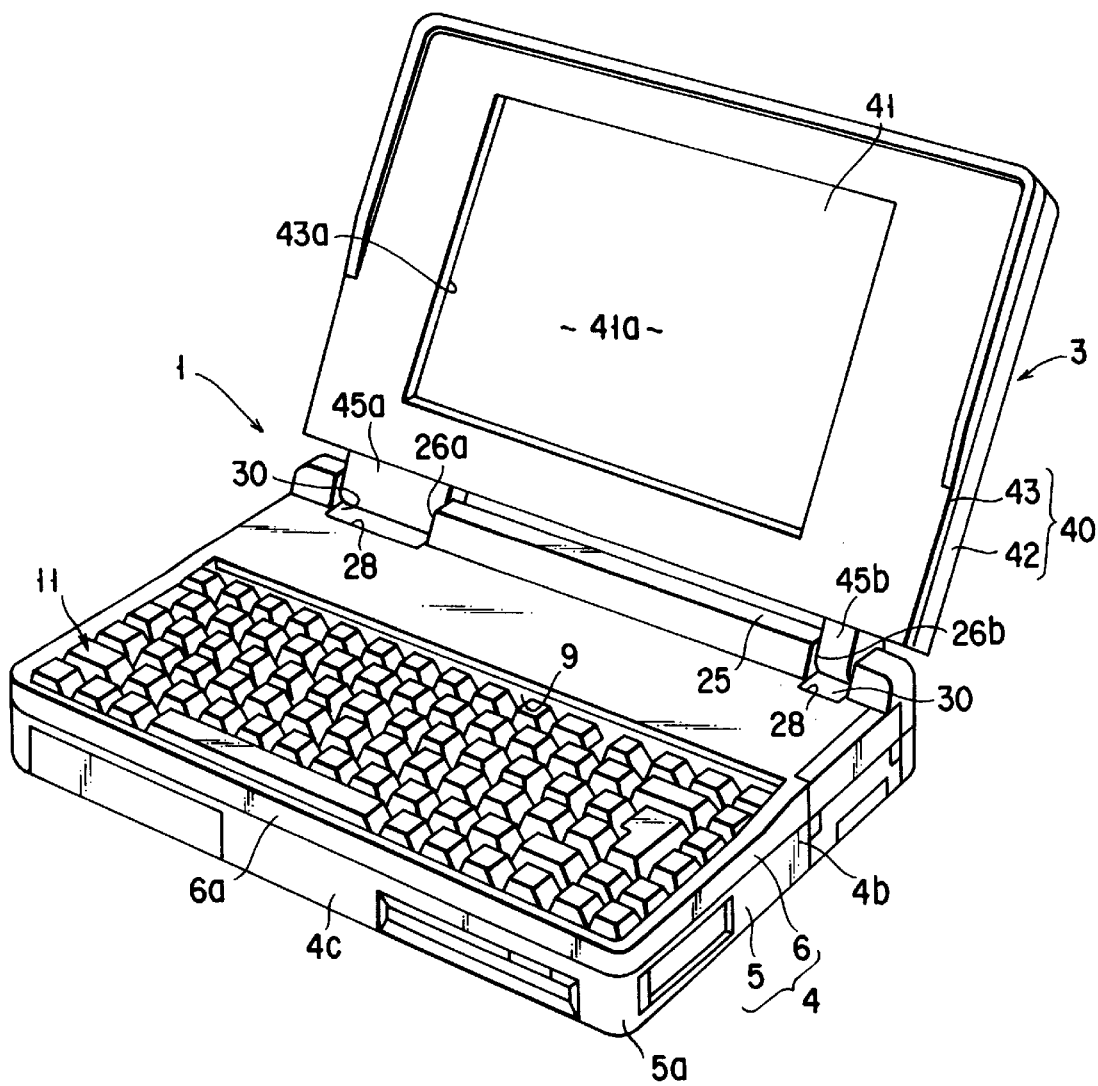
FIG. 13 is a perspective view of a portable computer according to a sixth embodiment of the invention.

As is shown in FIG. 11, the first leg attachment portion 26a has a communication hole 83. The communication hole 83 serves for passage of the hinge shaft 51 of the hinge device 46. The communication hole 83 is opened continuously from the side surface 81 to the bottom surface 82 of first leg attachment portion 26a. The communication hole 83 communicates with the inside of the housing body 4. The communication hole 83 is covered by a detachable hinge cover 84. The hinge cover 84 has a bottom wall 85 and a side wall 86 continuous with the bottom wall 85. The hinge cover 84 is fitted in the communication hole 83 from the inside of the upper housing 6 and is screwed to the upper housing 6. The bottom wall 85 of hinge cover 84 is continuous with the bottom surface 82 of first leg attachment portion 26a. The side wall 86 of hinge cover 84 is continuous with a lower end portion of side surface 81 of first leg attachment portion 26a. The side wall 86 cooperates with the lower end portion of the side surface 81 to form a first communication port 87. The first communication port 87 communicates with the inside of the projecting portion 25. The first communication port 87 faces the side wall 47b of first leg portion 45a. The side wall 47b has a second communication port 88. The first and second communication ports 87 and 88 communicate with each other, and the hinge shaft 51 is passed therethrough.

As is shown in FIGS. 9 and 11, the bottom surface 82 of first leg attachment portion 26a has an extension 90. The extension 90 is located at a left-hand, rear-side corner portion of housing body 4. The extension 90 extends to the left side of housing body 4 beyond the first leg portion 45.

The second circuit board 14 contained within the housing body 4 is located below the first leg attachment portion 26a. The second circuit board 14 is situated in parallel to the extension 90. The cable connector 23 is mounted on the upper surface of second circuit board 14. The cable connector 23 faces the extension 90 of first leg attachment portion 26a. The extension 90 of first leg attachment portion 26a has an opening portion 91. The opening portion 91 is located on the left side of the first leg portion 45a and opposed to the cable connector 23. Accordingly, the cable connector 23 is exposed to the outside of the housing body 4 through the opening portion 91.

One of the side surfaces, 47a, of the first leg portion 45a is located adjacent to the extension 90 of first leg attachment portion 26a. The side surface 47a has a first cable insertion hole 92. The first cable insertion hole 92 communicates with the inside of the first leg portion 45a. Accordingly, the first end portion 55a of cable 55 is drawn out of the first leg portion 45a through the first cable insertion port 92.

As is most clearly shown in FIG. 9, the first end portion 55a of cable 55 is situated on the extension 90 of first leg attachment portion 26a. A cylindrical core 93 for electromagnetic shielding is fitted on the first end portion 55a. The first connector 57 continuous with the first end portion 55a is electrically connected to the cable connector 23 through the opening portion 91. Thus, the cable 55 drawn out of the first leg portion 45a is connected to the cable connector 23, without being led into the housing body 4.

Figure 10:
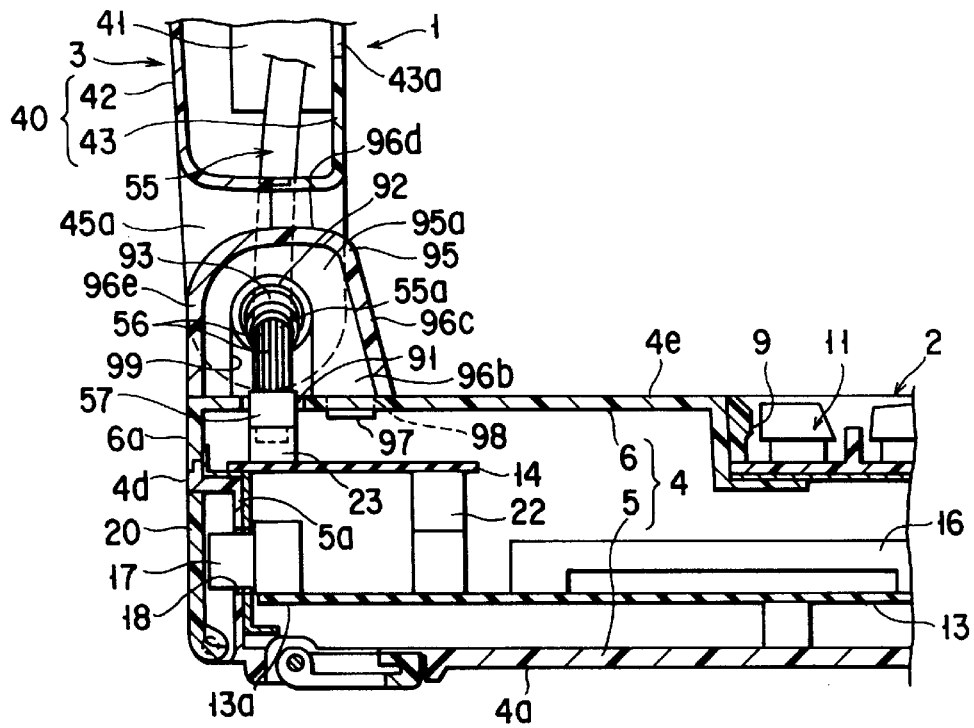
FIG. 10 is a cross-sectional view of the portable computer, showing a path of the cable.

As is shown in FIGS. 9 to 11, a cable cover 95 is detachably attached to the extension 90 of first leg attachment portion 26a. The cable cover 95 has first and second side walls 96a and 96b, a front wall 96c, a top wall 96d and a rear wall 96e. The cable cover 95 has a box-like shape and is opened downward. The first and second side walls 96a and 96b are spaced apart in the width direction of housing body 4. The side walls 96a and 96b have, at their lower end portions, engaging claws 97 projecting downward. The engaging claws 96 are detachably engaged in a pair of engaging holes 98 formed in the extension 90. Thereby, the cable cover 95 is held on the extension 90.

In the state in which the cable cover 95 is attached to the extension 90, the second side wall 96b faces the side surface 47a of first leg portion 45a. The second side wall 96b has a second cable insertion port 99. The second cable insertion port 99 is opened at the lower end of the second side wall 96b and communicates with the first cable insertion port 92 in the first leg portion 45a. The cable cover 95 is attached to the extension 90 of first leg attachment portion 26a after the first connector 57 of cable 55 is connected to the cable connector 23. Since the second cable insertion port 99 is opened at the lower end of second side wall 96b, the cable 55 is guided into the second cable insertion port 99 from the lower end of the second side wall 96b when the cable cover 55 is attached to the extension 90.

As is shown in FIG. 11, the first and second side walls 96a and 96b, front wall 96c and rear wall 96e of the cable cover 95 are continuous with the upper surface of the extension 90 of first leg attachment portion 26a. The cable cover 95 cooperates with the extension 90 to form a cable container 95a. The cable container 95a communicates with the opening portion 91 and second cable insertion port 99. Accordingly, the cable cover 95 covers continuously the cable 55 drawn out from the first leg portion 45a, core 93, first connector 57 and opening portion 91. The cable 55 and core 93 are thus contained in the cable container 95a.

A description will now be given of the procedure for coupling the first connector 57 of cable 55 to the cable connector 23 on the second circuit board 14 in the portable computer 1 having the above structure.

The cable cover 95 is removed, in advance, from the extension 90 of first leg attachment portion 26a, and the opening portion 91 in the extension 90 is exposed to the outside of the housing body 4. In this state, the first and second leg portions 45a and 45b of display unit 3 are coupled to the housing body 4 by means of the hinge devices 46. At the same time, the first end portion 55a of cable 55 is drawn out of the first cable insertion hole 92 in the first leg portion 45a and guided onto the extension 90 of first leg attachment portion 26a.

Subsequently, the first connector 57 of cable 55 is put in the opening portion 91 and connected to the cable connector 23. Thereby the first and second circuit boards 13 and 14 within the housing body 4 are electrically connected to the LCD 41 of display unit 3.

The cable cover 95 is then attached on the extension 90 of first leg attachment portion 26a, and the engaging claws 97 of cable cover 95 are engaged in the engaging holes 98. Thereby, the cable cover 95 is held on the extension 90, and the cable 55 drawn out of the first leg portion 45a, second connector 57 and opening portion 91 are covered by the cable cover 95. Thus, the first end portion 55a of cable 55 is contained within the cable container 95a, and the work for connecting the cable 55 is completed.

According to this structure, the opening portion 91 for exposing the cable connector 23 to the outside of the housing body 4 is formed in the extension 90 of first leg attachment portion 26a. The cable 55 drawn out of the first leg portion 45a is guided onto the extension 90, and the first connector 57 of cable 55 is put in the opening portion 91. Accordingly, the first connector 57 can be connected to the cable connector 23 without pulling the cable 55 into the housing body 4. Therefore, the length of extension of the cable 55 drawn out of the first leg portion 45a can be reduced.

The cable 55 for transmitting high-speed signals is not extended over the first circuit board 13. No electromagnetic noise is induced or coupled between the cable 55 and first circuit board 13. The cable 55 is prevented from functioning as an antenna radiating noise. Therefore, the noise radiated from the housing body 4 can be efficiently reduced, and there is no need to strengthen the electromagnetic shield for the housing body 4.

Besides, according to the above structure, the cable 55 drawn out of the first leg portion 45a is merely guided onto the extension 90 of first leg attachment portion 26a. Thus, there is no need to provide a space within the housing body 4 for receiving the cable 55. The housing body 4 can be reduced in size and thickness accordingly. Therefore, the portability of the portable computer 1 can be enhanced advantageously.

Moreover, the cable 55 drawn out of the first leg portion 45a is situated on the extension 90 of first leg attachment portion 26a. There is no need to form a hole in the first leg attachment portion 26a for passing the cable 55, or to provide a special cover for closing the hole. Therefore, the structure of the first leg attachment portion 26a is simplified. Besides, there is no need to perform such a time-consuming work as to pass the cable 55 through a hole and then close the hole with a cover. The work for assembling the portable computer 1 is facilitated.

FIGS. 13 to 18B show a sixth embodiment of the present invention. The sixth embodiment is a development of the first embodiment, and the basic structure of the portable computer 1 is common.

Figure 15:
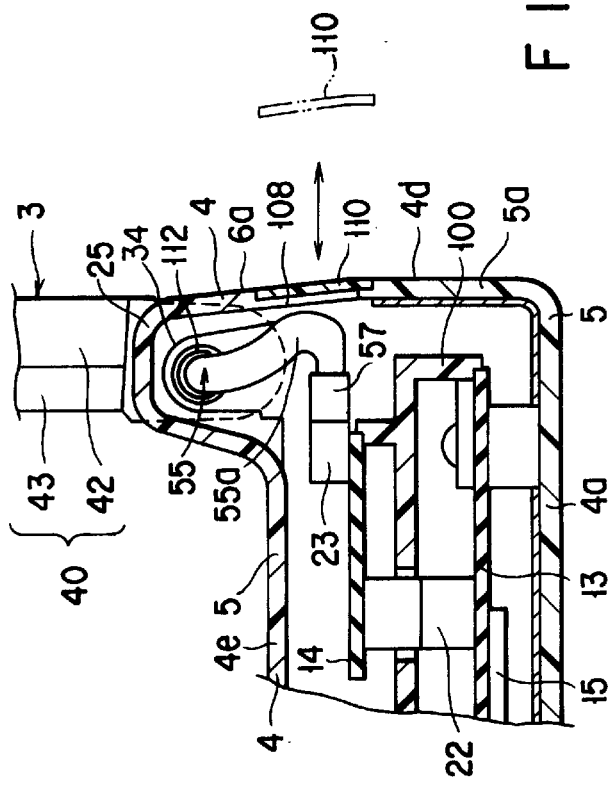
FIG. 15 is a cross-sectional view of the portable computer, showing a path of the cable.
Figure 16:
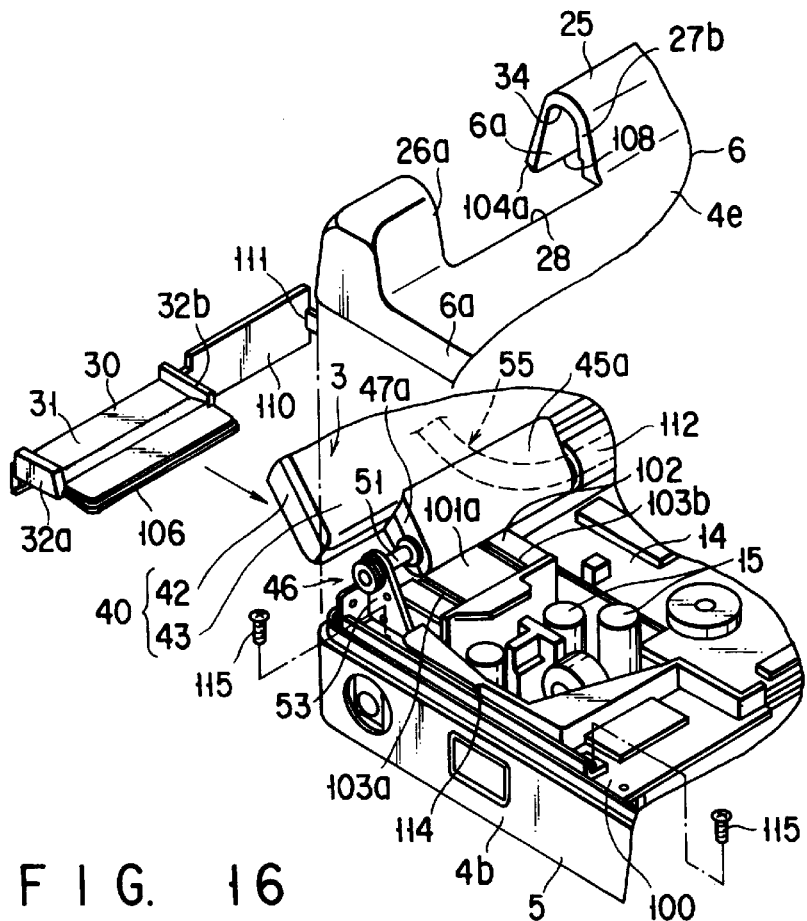
FIG. 16 is a perspective view showing, in an exploded manner, the relationship among the hinge cover, hinge device and housing body.
Figure 17:
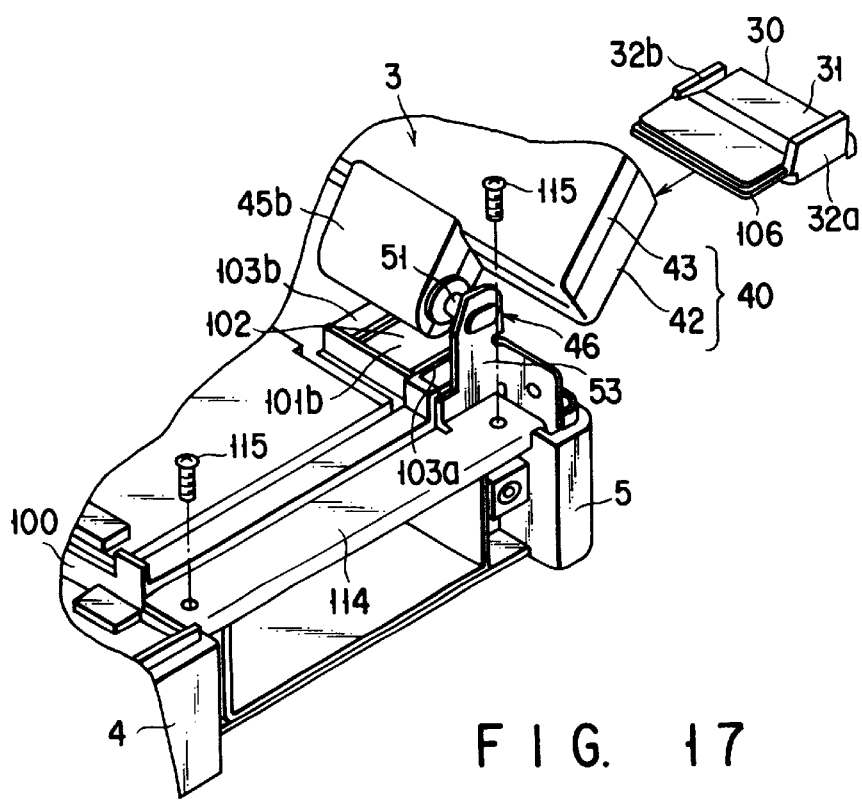
FIG. 17 is a perspective view showing, in an exploded manner, the relationship among the hinge cover, hinge device and housing body.

As is shown in FIG. 15, the first and second circuit boards 13 and 14 are contained within the housing body 4, with use of a frame 100 formed of synthetic resin. The frame 100 is screwed to the bottom wall 4a of lower housing 5. As is shown in FIGS. 16 and 17, the frame 100 has a pair of cover attachment seats 101a and 101b. The cover attachment seats 101a and 101b face the communication holes 28 of first and second leg attachment portions 26a and 26b. Each of cover attachment seats 101a and 101b has a flat upper surface 102. A pair of engaging grooves 103a and 103b are formed in the upper surface 102. The engaging grooves 103a and 103b are spaced apart from each other in the width direction of the housing body 4, and each of engaging grooves 103a and 103b extends in the depth direction of housing body 4.

Figure 14:
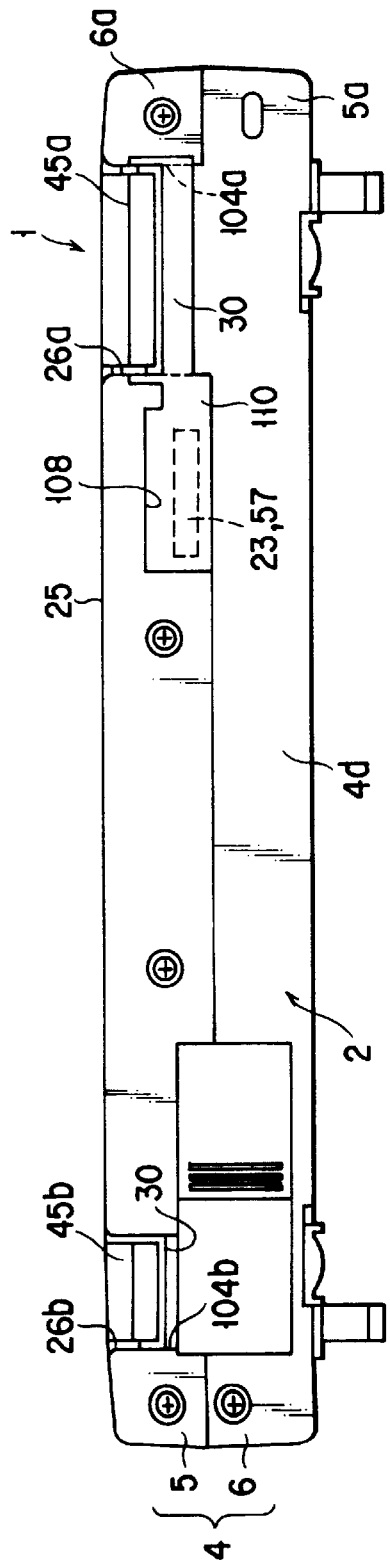
FIG. 14 is a rear view of the portable computer.

Rear-end part of the communication hole 28 of each of the first and second leg attachment portions 26a and 26b opens to the upper end portion of rear wall 4d of housing body 4. Thus, as shown in FIG. 14, a pair of insertion holes 104a and 104b continuous with the communication holes 28 of first and second leg attachment portions 26a and 26b are formed in the upper-end part of the rear wall 4d of housing body 4. The insertion holes 104a and 104b are continuous with the upper surfaces 102 of cover attachment seats 101a and 101b. The hinge cover 30 for covering the communication hole 28 is inserted in the communication hole 28 through the insertion holes 104a and 104b from the rear side of the housing body 4, after the lower housing 5 and upper housing 6 are coupled.

As is shown in FIGS. 18A and 18B, the bottom wall 31 of hinge cover 30 is superposed on the upper surface 102 of cover attachment seat 101a, 101b. A pair of engaging projections 105a and 105b are formed on the lower surface of bottom wall 31. When the hinge cover 30 is inserted in the communication hole 28, the engaging projections 105a and 105b are engaged in the engaging grooves 103a and 103b of cover attachment seats 101a and 101b. Thereby, the hinge cover 30 is aligned with the cover attachment seat 101a, 101b.

As is shown in FIGS. 16 and 17, the bottom wall 31 of hinge cover 30 has an engaging portion 106 at its peripheral portion. The engaging portion 106 is detachably engaged with an opening edge portion of the communication hole 28 and an opening edge portion of the insertion hole 104a, 104b. Thereby, the hinge cover 30 is held on the upper housing 6.

As is shown in FIGS. 14 and 15, the rear wall 4d of housing body 4 has an opening portion 108. The opening portion 108 is formed in the peripheral wall 6a of upper housing 6 and is located near the first leg attachment portion 26a. The opening portion 108 is continuous with the insertion hole 104a in the first leg attachment portion 26a. The opening portion 108 faces the cable connector 23 on the second circuit board 14 and has an opening shape greater than the cable connector 23.

As is shown in FIGS. 14 and 16, the hinge cover 30 covering the communication hole 28 in the first leg attachment portion 26a has an extension 110 integrally. The extension 110 has a flat plate-like shape with such a size as to permit tight fitting in the opening portion 108. The extension 110 is fitted in and closes the opening portion 108 when the hinge cover 30 is inserted in the communication hole 28 through the insertion hole 104a. The extension 110 has an engaging claw ill at its peripheral portion. The engaging claw 111 is detachably hooked on an opening edge portion of the opening portion 108 so that the extension 110 is held on the upper housing 6.

As is most clearly shown in FIG. 15, the first end portion 55a of cable 55 drawn out of the first leg portion 45a is guided into the projecting portion 25 through the first cable insertion port 34 in the first leg attachment portion 26a. An electromagnetic shield core 112 is fitted on the first end portion 55a of cable 55. The first connector 57 continuous with the first end portion 55a, like the first embodiment, is detachably coupled to the cable connector 23 from the rear side of the second circuit board 14. The connected part of the connectors 23 and 57 is opposed to the opening portion 108 and hidden by the extension 110 of hinge cover 30.

As is shown in FIGS. 16 and 17, in this embodiment, the first bracket 52 of hinge device 46 has a stay 114. The stay 114 extends in the depth direction of housing body 4. The stay 114 is fixed on the upper surface of the frame 100 by means of a plurality of screws 115.

A description will now be given of the procedure for coupling the first connector 57 of cable 55 to the cable connector 23 on the second circuit board 14 in the portable computer 1 having the above structure.

Before the first end portion 55a of cable 55 is introduced into the housing body 4, the upper housing 6 is separated from the lower housing 5 and the hinge cover 30 is removed from the upper housing 6. Thus, the communication hole 28 of first leg attachment portion 26a and the opening portion 108 continuous with the communication hole 28 are both opened.

In this state, the first end portion 55a of cable 55 is guided into the projecting portion 25 through the communication hole 28. Then, the upper housing 6 is coupled to the lower housing 5 to assemble the housing body 4. In this case, since the hinge cover 30 is removed from the upper housing 6, the first end portion 55a of cable 55 and first connector 57 guided into the projecting portion 25 are exposed to the outside of housing body 4 through the opening portion 108.

Subsequently, the fingers or a tool are inserted into the opening portion 108, and the first connector 57 of cable 55 led to the vicinity of the opening portion 108 is held by the fingers or tool and is coupled to the cable connector 23.

Then the hinge cover 30 is inserted into the communication hole 28 through the insertion hole 104a from the rear side of housing body 4, and the communication hole 28 is closed by the hinge cover 30. At this time, the cable 55 inserted into the communication hole 28 is guided by the second side wall 32b of hinge cover 30 and introduced into the first cable insertion port 34 defined by this side wall 32b and the side surface 27b of first leg attachment portion 26a. Accordingly, the first end portion 55a of cable 55 is guided into the projecting portion 25 through the first cable insertion port 34.

When the hinge cover 30 is inserted in the communication hole 28, the extension 110 of cover 30 is fitted in the opening portion 108 and the engaging claw 11 is hooked on the opening peripheral edge portion of the opening portion 108. Thereby, the opening portion 108 is closed and the connected part between the cable connector 23 and first connector 57 is hidden by the extension 110.

According to this portable computer 1, the cable connector 23 on the second circuit board 14 is located adjacent to the first leg attachment portion 26a in which the first leg portion 45a of display unit 3 is to be inserted. Thus, there is no need to introduce the first end portion 55a of cable 55 deep into the housing body 4. The length of the cable 55 running within the housing body 4 can be decreased. Therefore, like the first embodiment, the amount of noise radiated from the housing body 4 can be efficiently reduced, and there is no need to provide a space for receiving the cable 55 between the first circuit board 13 and top wall 4e of upper housing 6 or between the first circuit board 13 and keyboard 11.

Besides, according to this structure, the hinge cover 30 integrally has the extension 110 for closing the opening portion 108. Thus, the opening portion 108 can be closed at the same time as the communication hole 28 is closed by the hinge cover 30. Therefore, the number of assembly steps for the housing body 4 can be reduced, and the work for assembling the housing body 4 can be facilitated. Furthermore, there is no need to provide a special cover for closing the opening portion 108, and the number of parts can be reduced accordingly.

FIGS. 19 to 24 show a seventh embodiment of the present invention. The seventh embodiment differs from the first embodiment with respect to the structure of the housing body 4. In the other structural respects, the basic structure of the portable computer 1 is common.

Figure 20:
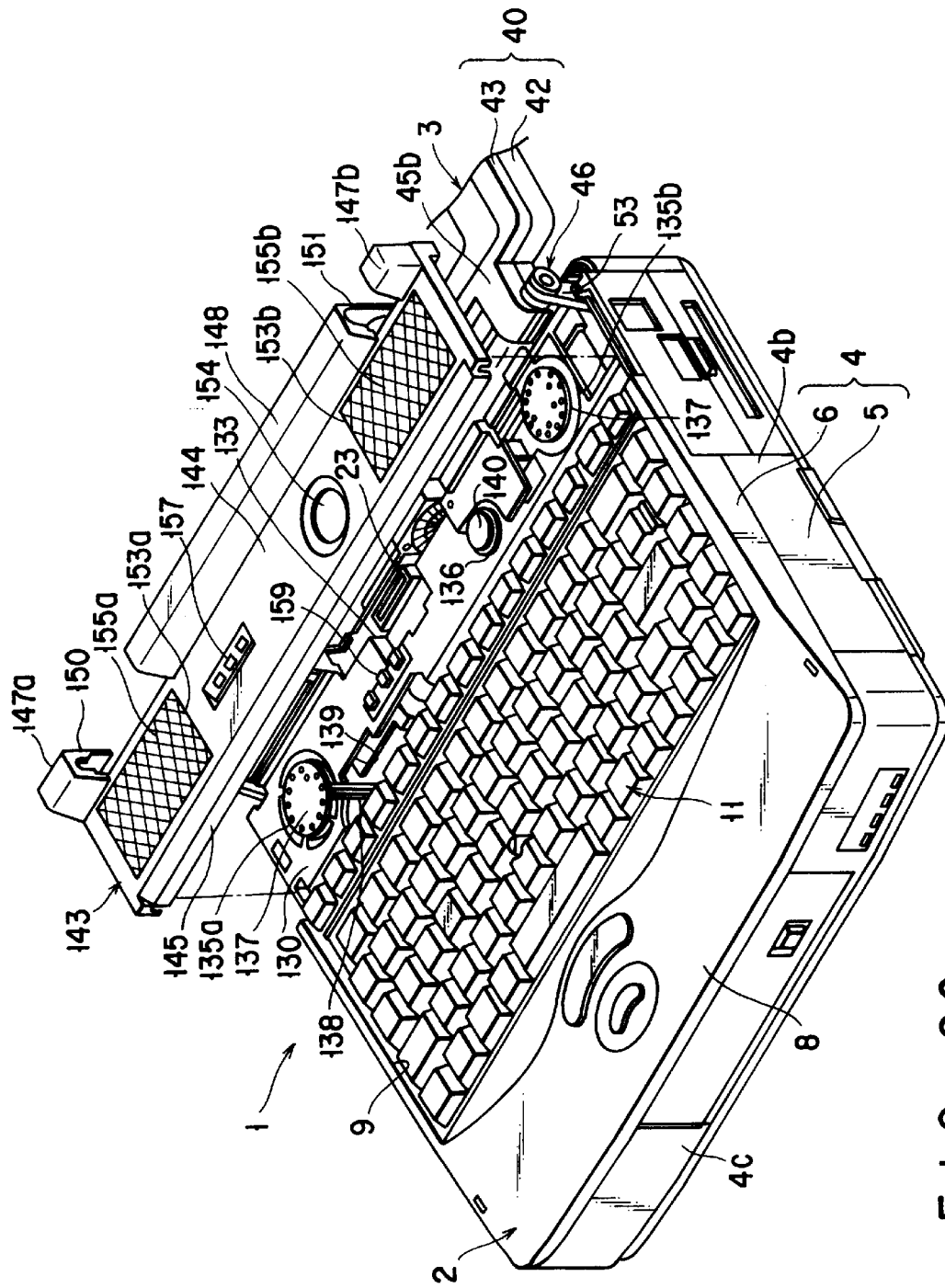
FIG. 20 is a perspective view of the portable computer, showing the state in which the top cover is removed from a component attachment portion of the housing body.
Figures 23, 24:
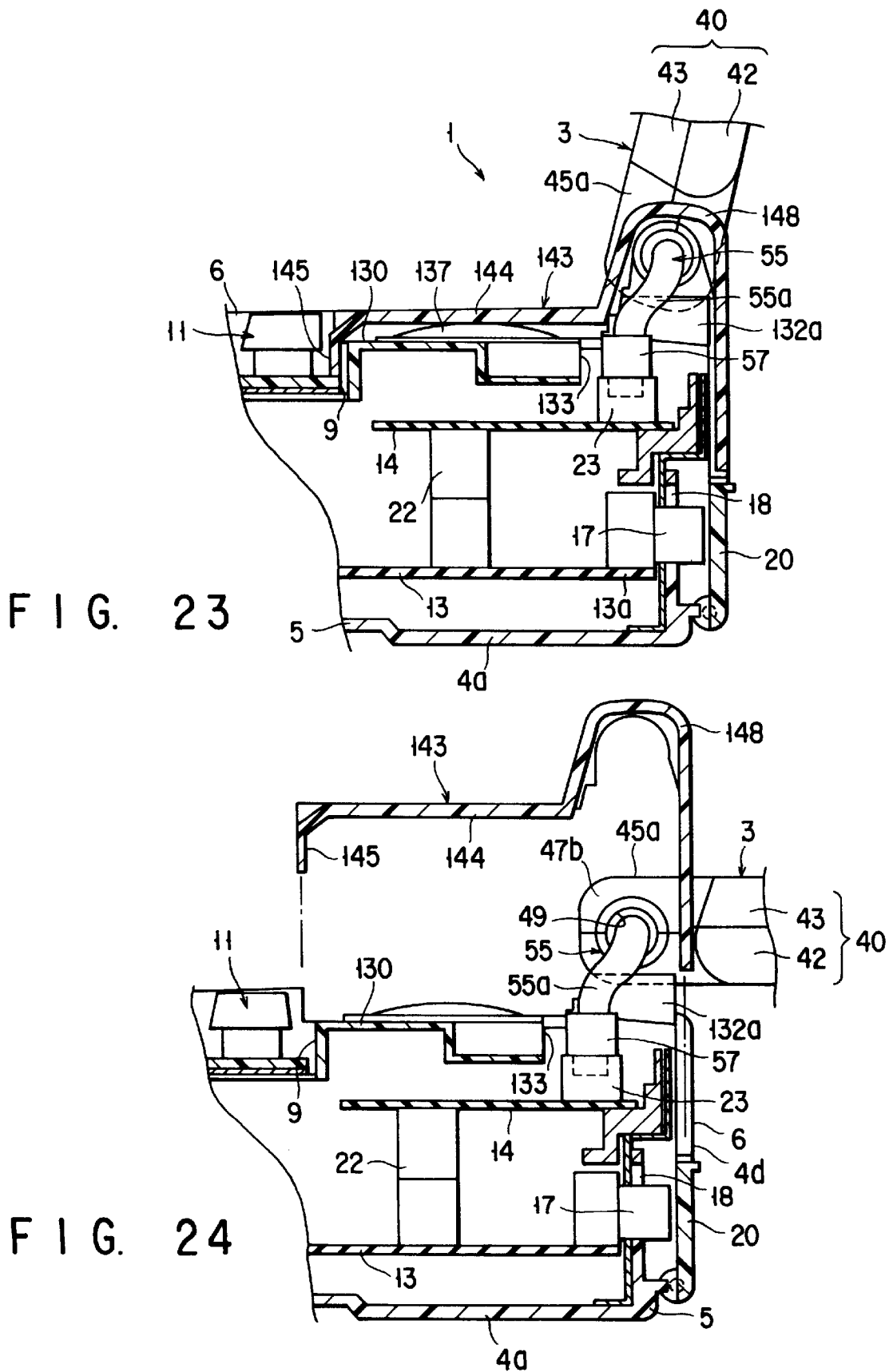
FIG. 23 is a cross-sectional view of the portable computer, showing a path of the cable within the housing body.
FIG. 24 is a cross-sectional view of the portable computer, showing the state in which the top cover is removed from the component attachment portion of the housing body.

As is shown in FIG. 20, the upper housing 6 has a component attachment portion 130. The component attachment portion 130 extends in the width direction of the housing body 4 behind the keyboard mount portion 9. The width of the component attachment portion 130 is equal to that of the housing body 4. As is shown in FIGS. 23 and 24, the component attachment portion 130 is situated above the second circuit board 14. Accordingly, the component attachment portion 130 covers, from above, the rear end portion of lower housing 5 including the second circuit board 14 and first circuit board 13.

Figure 21:
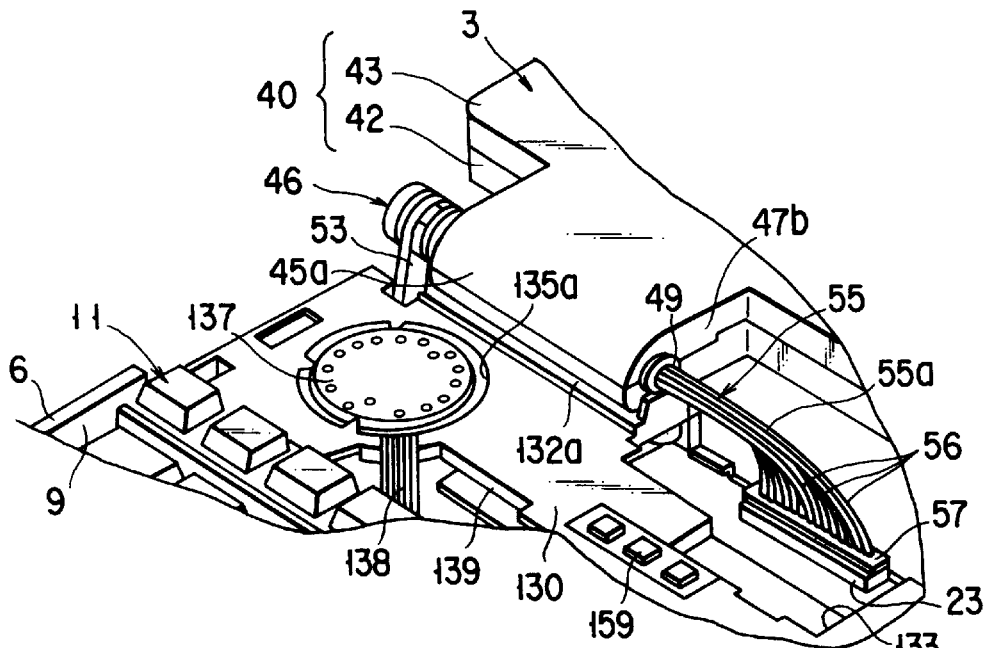
FIG. 21 is a perspective view of the portable computer, showing the state in which the cable led out from the first leg portion of the display unit is connected to the cable connector.
Figure 22:
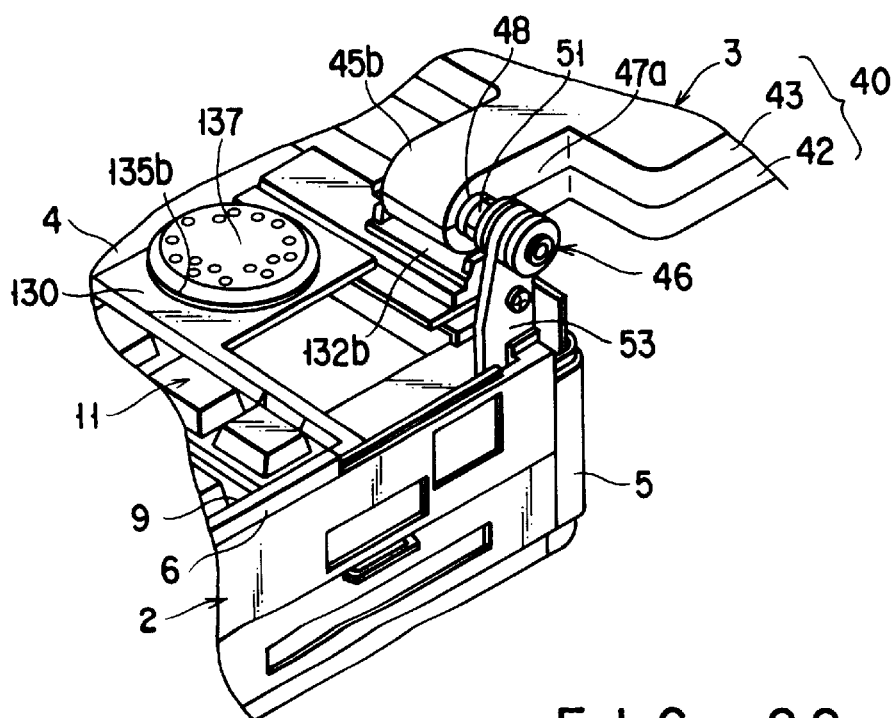
FIG. 22 is a perspective view of the portable computer, showing the coupling portion between the second leg portion of the display unit and the housing body.

As is shown in FIGS. 21 and 22, first and second cover portions 132a and 132b are integrally formed at the rear part of the component attachment portion 130. The first and second cover portions 132a and 132b are spaced apart from each other in the width direction of housing body 4. The first cover portion 132a is located below the first leg portion 45a of display unit 3 and opposed to a distal end portion of the first leg portion 45a. The second cover portion 132b is located below the second leg portion 45b of display unit 3 and opposed to a distal end portion of the second leg portion 45b.

As is most clearly shown in FIGS. 21 and 23, the component attachment portion 130 has an opening portion 133. The opening portion 133 is located adjacent to the first leg portion 45a and first cover portion 132a. The opening portion 133 is continuous with the inside of the housing body 4 and opposed to the cable connector 23 on the second circuit board 14. The opening portion 133 has an opening shape greater than the cable connector 23. The cable connector 23 is exposed to the outside of the housing body 4 through the opening portion 133. Accordingly, the first end portion 55a of cable 55 drawn out of the second cable insertion port 49 in the first leg portion 45a is guided toward the opening portion 133. The first connector 57 provided at the end of the first end portion 55a is coupled to the cable connector 23 through the opening portion 133.

The component attachment portion 130 has a pair of speaker attachment holes 135a and 135b and a dial attachment hole 136. Speakers 137 are supported as functional components in the speaker attachment holes 135a and 135b. Each speaker 137 has a lead line 138. The lead line 138 is guided into the housing body 4 through a through-hole 139 formed in the component attachment portion 130 and is connected to the second circuit board 14.

The dial attachment hole 136 is located between the speaker attachment holes 135a and 135b. A volume dial 140 is supported in the dial attachment hole 136. The volume dial 140 is interlocked with a volume switch (not shown) on the second circuit board 14.

As is shown in FIGS. 20 and 23, the component attachment portion 130 of housing body 4 is covered by a removable top cover 143 formed of a synthetic resin. The top cover 143 has a panel portion 144. The panel portion 144 has a flat, rectangular plate-like shape and is elongated in the width direction of housing body 4. The panel portion 144 is opposed to the component attachment portion 130 of upper housing 6.

As is shown in FIG. 20, a downwardly extending engaging wall 145 is formed at a front end portion of the panel portion 144. The engaging wall 145 is put in the rear end portion of the keyboard mount portion 9 so as to hold the rear end portion of keyboard 11 on the keyboard mount portion 9. First and second hinge cover portions 147a and 147b and a central cover portion 148 are integrally formed at the rear end portion of the panel portion 144. The first and second hinge cover portions 147a and 147b and central cover portion 148 are aligned in the width direction of housing body 4.

The first and second hinge cover portions 147a and 147b are located at both longitudinal ends of the panel portion 144. The first and second hinge cover portions 147a and 147b serve to cover the hinge shafts 51 and second brackets 53 of hinge devices 46. The first and second hinge cover portions 147a and 147b have hollow box-like shapes projecting upward of the panel portion 144. The first and second hinge cover portions 147a and 147b are screwed to the second brackets 53.

The central cover portion 148 extends in the width direction of the housing body 4 between the first and second hinge cover portions 147a and 147b. The central cover portion 148 serves to cover the rear end portion of the component attachment portion 130 including the opening portion 133 and the cable 55 drawn out of the first leg portion 45a. The central cover portion 148 has an elongated hollow box-like shape projecting upward of the panel portion 144.

A first leg insertion hole 150 is formed between the first hinge cover portion 147a and central cover portion 148. The first leg insertion hole 150 is associated with the first leg portion 45a of display unit 3. The first leg portion 45a is inserted in the first leg insertion hole 150. The lower end of the first leg insertion hole 150 is closed by the first cover portion 132a of component attachment portion 130.

A second leg insertion hole 151 is formed between the second hinge cover portion 147b and central cover portion 148. The second leg insertion hole 151 is associated with the second leg portion 45b of display unit 3. The second leg portion 45b is inserted in the second leg insertion hole 151. The lower end of the second leg insertion hole 151 is closed by the second cover portion 132b of component attachment portion 130.

The panel portion 144 of top cover 143 has a pair of sound output holes 153a and 153b and a dial hole 154. The holes 153a and 153b are opposed to the speakers 137. The holes 153a and 153b are covered by mesh-like speaker covers 155a and 155b. The dial hole 154 is opposed to the volume dial 140. The volume dial 140 is exposed to the outside of the housing body 4 through the dial hole 154.

An icon 157 is provided on a central portion of the panel portion 144, as shown in FIGS. 19 and 20. The icon 157 displays information on the control keys of keyboard 11. The icon 157 is opposed to the component attachment portion 130. An optical guide 159 for guiding light from a light emitting diode (not shown) to the icon 157 is supported on the component attachment portion 130.

A description will now be given of the procedure for coupling the first connector 57 of cable 55 to the cable connector 23 on second circuit board 14 in the portable computer 1 having the above structure. As is shown in FIGS. 20 and 24, the top cover 143 is removed from the component attachment portion 130 of upper housing 6. The opening portion 133 of component attachment portion 130 is exposed to the outside. In this state, the first end portion 55a of cable 55 drawn out of the first leg portion 45a is guided to the component attachment portion 130. The first connector 57 of first end portion 55a is coupled to the cable connector 23 through the opening portion 133. Thereby, the first and second circuit boards 13 and 14 within the housing body 4 are electrically connected to the LCD 41 of display unit 3.

Subsequently, the top cover 143 is put on the component attachment portion 130. The component attachment portion 130 is thus covered by the panel portion 144 of the top cover 143, and the hinge devices 46 are covered by the first and second hinge cover portions 147a and 147b. The central cover portion 148 of top cover 143 is located between the first and second leg portions 45a and 45b of display unit 3. The cable 55 drawn out of the first leg portion 45a is covered by the left-hand end portion of central cover portion 148. Accordingly, the cable 55 is contained in the space surrounded by the component attachment portion 130 and central cover portion 148. Thus, the procedure for connecting the cable 55 is completed.

According to the above structure, the cable connector 23 is exposed to the component attachment portion 130 of upper housing 6 through the opening portion 133. In addition, the cable connector 23 and opening portion 133 are located adjacent to the second cable insertion port 49 of first leg portion 45a. Accordingly, the cable 55 drawn out of the first leg portion 45a can be connected to the cable connector 23 without introducing the cable 55 into the housing body 4. Thus, the length of path for connecting the cable 55 can be reduced.

The cable 55 for transmitting high-speed signals is not extended over the first circuit board 13. No electromagnetic noise is induced or coupled between the cable 55 and first circuit board 13. The cable 55 is surely prevented from functioning as an antenna radiating noise. Therefore, the noise radiated from the housing body 4 can be efficiently reduced.

According to the above structure, since the cable 55 drawn out of the first leg portion 45a is guided onto the component attachment portion 130 of housing body 4, there is no need to introduce the cable 55 into the housing body 4. Thus, there is no need to provide a space within the housing body 4 for receiving the cable 55. The housing body 4 can be reduced in size and thickness accordingly.

In addition, the opening portion 133 can be closed by using the top cover 143 for covering the component attachment portion 130. Thus, there is no need to provide a special cover for closing the opening portion 133. Therefore, the number of parts does not increase, and the structure of the housing body 4 is simplified and the work for assembling the housing body 4 is facilitated.

Figure 25:
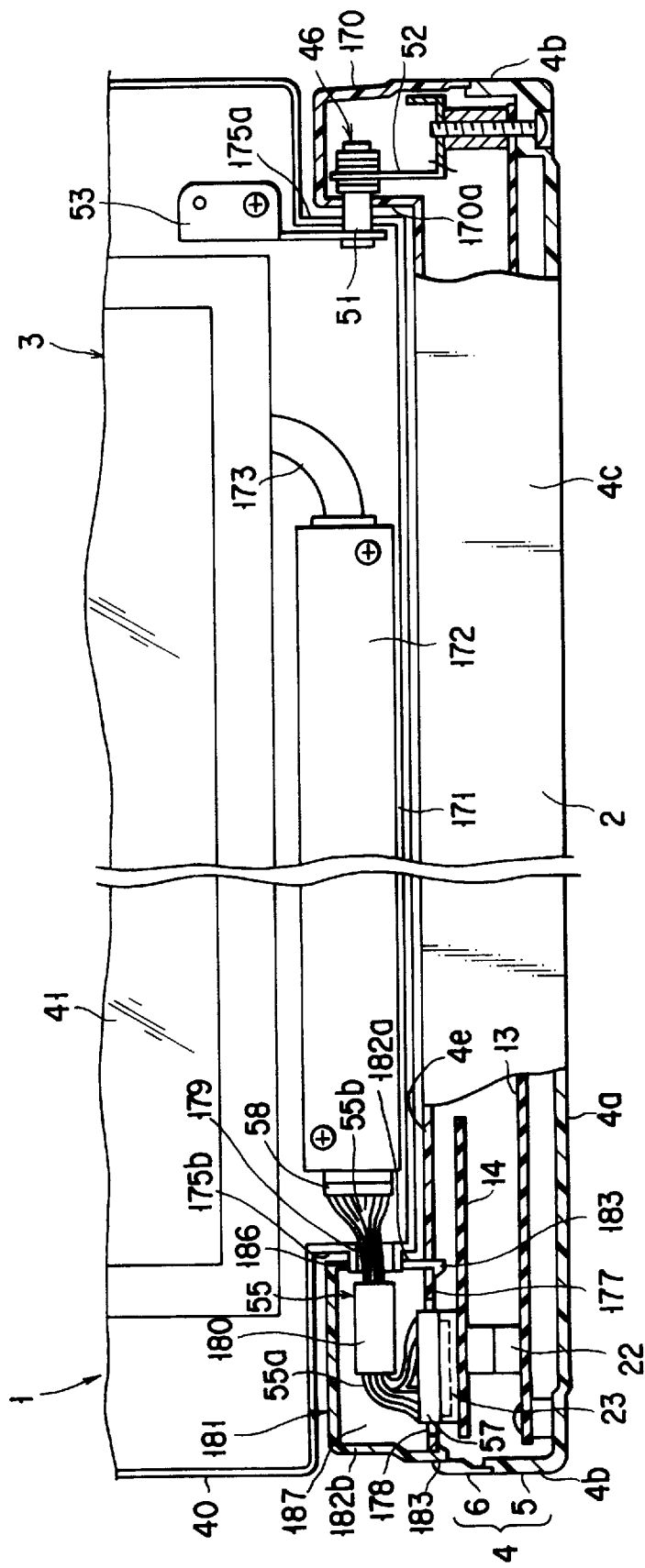
FIG. 25 is a cross-sectional view of a portable computer according to an eighth embodiment of the invention.

FIG. 25 shows an eighth embodiment of the present invention.

According to the eighth embodiment, the housing body 4 has a hollow projecting portion 170 at a rear end portion of the top wall 4e. The projecting portion 170 is located at a right-hand corner portion of the upper housing 6. The projecting portion 170 has a side surface 170a continuous with the upper surface of the top wall 4e.

The display housing 40 of display unit 3 has a single leg portion 171. The leg portion 171 is located at an end portion of the display housing 40, which faces the top wall 4e of housing body 4. The leg portion 171 extends in the width direction of display housing 40. The leg portion 171 has a hollow shape and communicates with the inside of the display housing 40. A drive circuit unit 172 for driving the LCD 41 is contained within the leg portion 171. The drive circuit unit 172 is electrically connected to the LCD 41 over a cable 173.

The leg portion 171 has first and second leg side surfaces 175a and 175b. The first leg side surface 175a is opposed to the side surface 170a of projecting portion 170. The second leg side surface 175b is located on the opposite side of the first leg side surface 175a in the width direction of the display housing 40.

The leg portion 40 is rotatably supported on the housing body 4 by means of a single hinge device 46. The hinge device 46 is located at a right-hand end portion of the housing body 4 in the vicinity of the projecting portion 170. The hinge shaft 51 of hinge device 46 is situated horizontal, penetrating the side surface 170a of projecting portion 170 and the first leg side surface 175a of leg portion 171.

As is shown in FIG. 25, the top wall 4e of housing body 4 has a cover support portion 177. The cover support portion 177 is located at a left-hand, rear-side corner portion of housing body 4. The cover support portion 177 projects horizontal to the left side of housing body 4 from the second leg side surface 175b of leg portion 171.

The second circuit board 14 contained within the housing body 4 is situated below the cover support portion 177. The second circuit board 14 is situated in parallel to the cover support portion 177. The cable connector 23 is mounted on the upper surface of the second circuit board 14. The cable connector 23 is located on the left side of the leg portion 171. The cover support portion 177 has an opening portion 178. The opening portion 178 is located on the left side of the leg portion 171 and opposed to the cable connector 23. Accordingly, the cable connector 23 is exposed to the outside of housing body 4 through the opening portion 178.

The second leg side surface 175b of leg portion 171 is located adjacent to the cover support portion 177. The second leg side surface 175b has a first cable insertion port 179. The first cable insertion port 179 communicates with the inside of the leg portion 171. The first end portion 55a of cable 55 is drawn out of the leg portion 171 through the first cable insertion port 179. The first end portion 55a of cable 55 is positioned above the cover support portion 177. An electromagnetic shield cylindrical core 180 is fitted on the first end portion 55a. The first connector 57 provided at the first end portion 55a is electrically connected to the cable connector 23 through the opening portion 178. Thus, the cable 55 drawn out of the leg portion 171 of display unit 3 is connected to the cable connector 23 without being guided into the housing body 4. The second end portion 55b of cable 55 is introduced into the leg portion 171. The second connector 58 provided at the second end portion 55b is electrically connected to the drive circuit unit 172.

A cable cover 181 is detachably mounted on the cover support portion 177 of housing body 4. The cable cover 181 has a hollow box-like shape opened downward. The cable cover 181 has a pair of mutually opposed side walls 182a and 182b. Downwardly extending engaging claws 183 are formed at lower end portions of the side walls 182a and 182b. The engaging claws 183 are detachably engaged with the cover support portion 177. Thereby, the cable cover 181 is held on the cover support portion 177. In the state in which the cable cover 181 is attached on the cover support portion 177, one of the side walls, 182a, faces the second leg side surface 175b of leg portion 171, and the other side wall 182b is continuous with the left-hand side wall 4b of housing body 4.

The side wall 182a of cable cover 181 has a second cable insertion port 186. The second cable insertion port 186 is opened at the lower end of the side wall 182a and is continuous with the first cable insertion port 179. The cable cover 181 is attached on the cover support portion 177 of housing body 4 after the first connector 57 of cable 55 is connected to the cable connector 23. Since the second cable insertion hole 186 of cable cover 181 is opened at the lower end of side wall 182a, the cable 55 is guided from the lower end of side wall 182a to the second cable insertion port 186 when the cable cover 55 is attached on the cover support portion 177.

The cable cover 181 cooperates with the cover support portion 177 to form a cable container 187. The cable container 187 is continuous with the opening portion 178 and second cable insertion port 186. Thus, the cable cover 181 covers continuously the cable 55 drawn out of the leg portion 171, core 180, first connector 57 and opening portion 178. Accordingly, the cable 55 and core 180 led out of the leg portion 171 are contained within the cable container 187.

When the first connector 57 of cable 55 is to be connected to the cable connector 23 of second circuit board 14 in the portable computer 1 having the above structure, the cable cover 181 is removed from the cover support portion 177 of housing body 4 in advance and the opening portion 178 of cover support portion 177 is exposed to the outside of housing body 4. In this state, the cable 55 drawn out of the leg portion 171 of display unit 3 is guided onto the cover support portion 177. The first connector 57 of cable 55 is inserted in the opening portion 178 and thus coupled to the cable connector 23. Accordingly, the first and second circuit boards 13 and 14 within the housing body 4 are electrically connected to the LCD 41 of display unit 3.

Subsequently, the cable cover 181 is attached to the cover support portion 177. The cable cover 181 covers the cable 55 led out of the leg portion 171, the first connector 57 and opening portion 178. The cable 55 drawn out of the leg portion 171 is thus contained within the cable container 187 defined by the cable cover 181 and cover support portion 177. In this way, the procedure for connecting the cable 55 is completed.

According to the above structure, the opening portion 178 for exposing the cable connector 23 to the outside of housing body 4 is formed in the cover support portion 177 of housing body 4 which is located adjacent to the leg portion 171 of display unit 3. The cable 55 drawn out of the leg portion 177 is guided onto the cover support portion 177, and the first connector 57 of cable 55 is connected to the cable connector 23 through the opening portion 178. Accordingly, the first connector 57 can be coupled to the cable connector 23 without introducing the cable 55 into the housing body 4, and the length of cable 55 drawn out of the leg portion 171 is decreased.

The cable 55 for transmitting high-speed signals is not extended over the first circuit board 13. No electromagnetic noise is induced or coupled between the cable 55 and first circuit board 13. The cable 55 is surely prevented from functioning as an antenna radiating noise. Therefore, the noise radiated from the housing body 4 can be efficiently reduced.

According to the above structure, since the cable 55 drawn out of the leg portion 171 is merely guided onto the cover support portion 177, there is no need to introduce the cable 55 into the housing body 4. Thus, there is no need to provide a space within the housing body 4 for receiving the cable 55. The housing body 4 can be reduced in size and thickness accordingly and the portability of portable computer 1 can be enhanced.

In the above embodiments, the circuit board and LCD are electrically connected over the cable comprising a number of lead wires. The present invention, however, is not limited to these embodiments. This cable may be replaced with a flexible circuit board.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:

a housing body;

a display unit having a display housing containing a display device, the display unit being rotatably supported on the housing body between a first position where the upper surface of the housing body is covered by the display unit and a second position where the display unit stands so that the upper surface of the housing body is exposed;

a circuit board contained within the housing body, the circuit board comprising a cable connector, the cable connector being situated under the lower end portion of the display housing when the display unit is rotated to the second position; and a cable having a first end portion and a second end portion, the cable extending between an inside of the housing body and an inside of the display housing, the first end portion being electrically connected to the cable connector, and the second end portion being electrically connected to the display device, wherein said housing body has an opening portion used when the first end portion of the cable introduced within the housing body is connected to the cable connector, and the opening portion can be opened and closed by a cover.

2. The electronic apparatus according to claim 1, wherein said housing body includes a lower housing and an upper housing detachably coupled to the lower housing, said circuit board and said display unit are supported by the lower housing, and said opening portion is formed in the upper housing.

3. The electronic apparatus according to claim 2, wherein said upper housing has a leg attachment portion, said display housing has a leg portion situated in the leg attachment portion, said leg attachment portion has a first cable insertion port communicating with the inside of the housing body, said leg portion has a second cable insertion port communicating with the first cable insertion port, and said cable extends between the inside of the housing body and the inside of the display housing through the first and second cable insertion ports.

4. The electronic apparatus according to claim 1, wherein said cable connector is situated adjacent to a cable insertion port within the housing body.

5. The electronic apparatus according to claim 2, wherein in a state in which the upper housing is coupled to the lower housing, the first end portion of the cable is detachably connected to the cable connector by the fingers or a tool inserted into the housing body through said opening portion.

6. The electronic apparatus according to claim 2, wherein said cover has such a size as to permit tight fitting in said opening portion, and the cover is detachably supported on the upper housing.

7. An electronic apparatus comprising:

a housing body having a display support portion on an upper surface thereof;

first and second circuit boards contained within the housing body, the second circuit board being electrically connected to the first circuit board and situated above the first circuit board;

a display unit having a display housing containing a display device, the display unit being rotatably supported on the display support portion of the housing body between a first position where the upper surface of the housing body is covered by the display unit and a second position where the display unit stands so that the upper surface of the housing body is exposed;

a cable connector mounted on the second circuit board, the cable connector contained within the housing body, and situated under the lower end portion of the display housing when the display unit is rotated to the second position; and a cable having a first end portion and a second end portion, the cable extending between an inside of the housing body and an inside of the display housing, the first end portion being electrically connected to the cable connector, and the second end portion being electrically connected to the display device, wherein said cable connector is situated adjacent to the display support portion within the housing body, said housing body comprising, in a position facing the cable connector, an opening portion used when the first end portion of the cable introduced into the housing body with the cable connector, and the opening portion can be opened and closed by a cover.

8. An electronic apparatus comprising:

a housing body having a leg attachment portion and an opening portion formed at a position adjacent to the leg attachment portion;

a circuit board contained within the housing body, said circuit board having a cable connector at a position facing the opening portion;

a display unit having a display housing containing a display device, the display housing having a leg portion situated in the leg attachment portion, said leg portion having a first cable insertion port communicating with an inside of the display housing, the display unit being rotatable supported on the housing body between a first position where the upper surface of the housing body is covered by the display unit and a second position where the display unit stands so that the upper surface of the housing body is exposed;

a cable having a first end portion and a second end portion, the cable extending between an inside of the housing body and an inside of the display housing, the first end portion being drawn out outwards the display housing through the first cable insertion port, and being electrically connected from the opening portion to the cable connector, and the second end portion being electrically connected to the display device within the display housing; and a cover detachably attached to the housing body, the cover covering the opening portion and the connection portion between the first end portion of the cable and the cable connector, and the cover comprising a second cable insertion port communicating with the first cable insertion port to let the cable pass through.

9. The electronic apparatus according to claim 8, wherein said housing body includes a lower housing and an upper housing detachably coupled to the lower housing, said circuit board and said leg portion of the display unit are supported on the lower housing, and said leg attachment portion and said opening portion are formed in the upper housing.

10. The electronic apparatus according to claim 9, wherein said upper housing has a top wall in which said opening is formed, and said cover is detachably attached to the top wall.

11. The electronic apparatus according to claim 10, wherein the first end portion of the cable has a connector to be detachably connected to the cable connector.

12. The electronic apparatus according to claim 10, wherein the first end portion of the cable is covered with an electromagnetic shield core, and the core is situated in the cover.

13. An electric apparatus comprising:

a housing body having a top wall;

a circuit board contained within the housing body, the circuit board having a cable connector;

a keyboard placed on the top wall of the housing body;

a component attachment portion formed on the top wall of the housing body and supporting a plurality of functional components, the component attachment portion being located behind the keyboard and having an opening portion situated adjacent the cable connector for exposing the cable connector;

a display unit having a display housing containing a display device, the display unit being supported on a rear end portion of the housing body which is continuous with the component attachment portion;

a cable having a first end portion and a second end portion, the cable extending between an inside of the housing body and an inside of the display housing, the first end portion being drawn out outwards the display housing and being electrically connected to the cable connector through the opening portion, and the second end portion being electrically connected to the display device within the display housing; and a top cover detachably supported on the component attachment portion of the housing body, the top cover covering the functional components, the opening portion, the cable, and the connection portion between the cable connector and the first end portion.

14. The electronic apparatus according to claim 13, wherein said component attachment portion extends in the width direction of the housing body, and the component attachment portion has a width equal to a width of the housing body.

15. The electronic apparatus according to claim 13, wherein said housing body includes a lower housing and an upper housing detachably coupled to the lower housing, the lower housing includes a bottom wall for supporting the circuit board, and the upper housing includes a top wall including the component attachment portion.

16. The electronic apparatus according to claim 1, wherein the circuit board comprises an extension connector being mounted in a position adjacent to the cable connector, the opening portion has a size to expose both the cable connector and the extension connector, and the cover is movably supported on the housing body, between a closed position where the cover closes the opening portion and an open position where the cover opens the opening portion, the cover comprises: a communication opening portion opposed to the extension connector when the cover is situated in the closed position; and a connector cover movable between a closed position where the connector cover closes the communication opening portion and an open position where the connector cover opens the communication opening portion.

17. An electronic apparatus comprising:

a housing body having a lower housing and an upper housing detachably coupled to the lower housing;

a display unit having a display housing containing a display device, the display unit being rotatably supported on the housing body between a first position where the upper surface of the housing body is covered by the display unit and a second position where the display unit stands so that the upper surface of the housing body is exposed, the display unit being supported by the lower housing;

a circuit board contained within the housing body, the circuit board comprising a cable connector, the cable connector being situated under the lower end portion of the display housing when the display unit is rotated to the second position, the circuit board being supported by the lower housing; and a cable having a first end portion and a second end portion, the cable extending between an inside of the housing body and an inside of the display housing, the first end portion being electrically connected to the cable connector, and the second end portion being electrically connected to the display device, wherein said housing body has an opening portion used when the first end portion of the cable introduced within the housing body is connected to the cable connector, and the opening portion can be opened and closed by a cover, and wherein said upper housing has a leg attachment portion, said display housing has a leg portion situated in the leg attachment portion, said leg attachment portion has a first cable insertion port communicating with the inside of the housing body, said leg portion has a second cable insertion port communicating with the first cable insertion port, said cable extends between the inside of the housing body and the inside of the display housing through the first and second cable insertion ports, and said cable connector is situated adjacent to the first cable insertion port within the housing body.

* * * * *

UNITED STATES PATENT AND TRADEMARK OFFICE
CERTIFICATE OF CORRECTION

PATENT NO. : 6,125,029  Page 1 of 1
DATED : September 26, 2000
INVENTOR(S) : Katsumaru Sasaki et al.

It is certified that error appears in the above-identified patent and that said Letters Patent is hereby corrected as shown below:

Column 26,
Line 34, "rotatable supported" should read -- rotatably supported --.

Signed and Sealed this

Second Day of December, 2003

JAMES E. ROGAN
*Director of the United States Patent and Trademark Office*